United States Patent
Naruse et al.

(10) Patent No.: US 7,129,834 B2
(45) Date of Patent: Oct. 31, 2006

(54) STRING WIRELESS SENSOR AND ITS MANUFACTURING METHOD

(75) Inventors: Yujiro Naruse, Kanagawa-ken (JP); Shigeru Machida, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 581 days.

(21) Appl. No.: 10/397,875

(22) Filed: Mar. 27, 2003

(65) Prior Publication Data
US 2003/0214399 A1   Nov. 20, 2003

(30) Foreign Application Priority Data
Mar. 28, 2002 (JP) ............................... 2002-091594
Aug. 27, 2002 (JP) ............................... 2002-246643
Dec. 9, 2002 (JP) ............................... 2002-356628

(51) Int. Cl.
*G08B 1/08* (2006.01)

(52) U.S. Cl. ........................... 340/539.1; 340/539.13; 340/539.26; 340/586

(58) Field of Classification Search ............ 340/539.1, 340/539.13, 539.26, 571, 572.1, 572.9, 585, 340/586
See application file for complete search history.

(56) References Cited

U.S. PATENT DOCUMENTS

| | | | |
|---|---|---|---|
| 4,593,561 A * | 6/1986 | Gavrilovic | 73/170.29 |
| 6,188,645 B1 * | 2/2001 | Maida et al. | 367/151 |
| 6,672,422 B1 * | 1/2004 | Orban et al. | 181/108 |
| 6,992,951 B1 * | 1/2006 | O'Brien et al. | 367/15 |
| 7,000,697 B1 * | 2/2006 | Goode et al. | 166/250.17 |
| 7,009,645 B1 * | 3/2006 | Sandini et al. | 348/275 |

* cited by examiner

*Primary Examiner*—Daryl C Pope
(74) *Attorney, Agent, or Firm*—Oblon, Spivak, McClelland, Maier & Neustadt, P.C.

(57) ABSTRACT

A string wireless sensor 11 comprising a wireless sensor 13, incorporating the transmitting portion, which transmits electric signals by wireless and a string holder (polymer 12) which holds the wireless sensor at a certain distance.

7 Claims, 23 Drawing Sheets

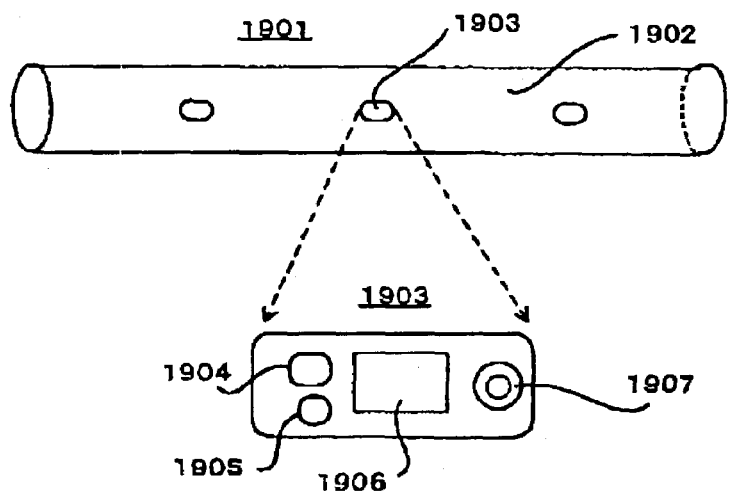
FIG.19A
FIG.19B
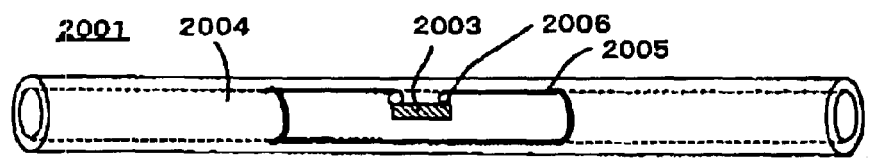
FIG.20
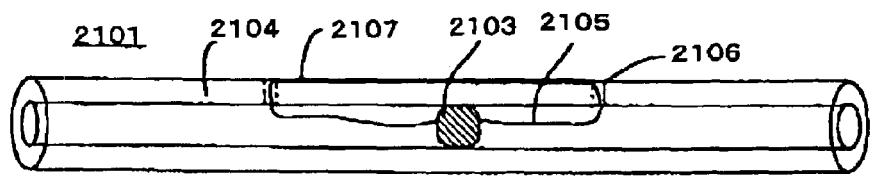
FIG.21

STRING WIRELESS SENSOR AND ITS MANUFACTURING METHOD

CROSS REFERENCE TO RELATED APPLICATION

This patent application is prepared basing upon the interest of priority of Japanese patent application 2002-91594 filed on Mar. 28, 2002, the interest of priority of Japanese patent application 2002-246643 filed on Aug. 27, 2002 as well as the interest of priority of the Japanese patent application 2002-356628 filed on Dec. 9, 2002. The entire disclosure of these Japanese patent applications have been incorporated in the present patent application by reference.

BACKGROUND OF THE INVENTION

1. Field of the Invention

The present invention relates to string wireless sensor using fine wireless sensor and its manufacturing method.

2. Description of the Related Art

In the recent years attention has been paid to the technology of the information collection using many wireless sensors of sesame grain size comprising a wireless communication IC and an antenna as a nano-technology in the various fields.

When detailed information should be collected from a certain field using wires sensors as described in the above, it is possible to collect the information accordingly, if wireless sensors are placed in the field in question. However, it is not advisable to locate the sensors concentrated in a certain field as the cost becomes high, when taking the costs of wireless sensors into consideration. Also, it is not normally necessary to obtain much information from a narrow field, and it is generally useless.

Therefore, in order to use such wireless sensors effectively, it is necessary to distribute the wireless sensors uniformly to a certain degree. However, it is normally difficult to distribute the sensors always almost uniformly.

BRIEF SUMMARY OF THE INVENTION

The present invention has been made in view of the past problems as described in the above, and the object of the invention is to distribute wireless sensors almost uniformly, by using a string holder in which wireless sensors are located at a certain distance.

In order to achieve the object, an aspect of the present invention is to provide a string wireless sensor comprising a wireless sensor which incorporates a transmitter that can transmit electric signals by wireless, and a string holder, in which a plurality of sensors are located at a certain distance.

BRIEF DESCRIPTION OF THE DRAWINGS

FIG. 19A and FIG. 19B are drawings showing the string wireless sensor of further another embodiment of the present invention.

FIG. 20 is a drawing showing the string wireless sensor of further another embodiment of the present invention.

FIG. 21 is a drawing showing the string wireless sensor in accordance with further another embodiment of the present invention.

DETAILED DESCRIPTION OF THE INVENTION

Figure 1:
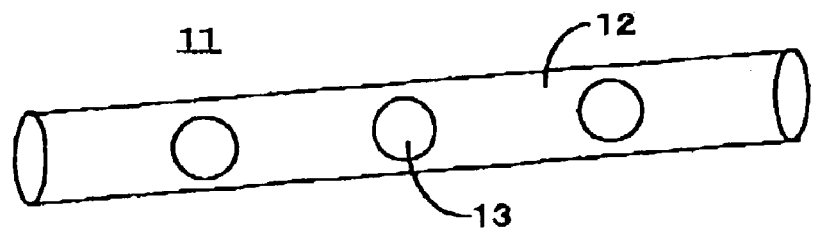
FIG. 1 is a drawing showing the string wireless sensor in accordance with the first embodiment of the present invention.

In the following the respective embodiments are explained by referring to the drawings. In order to distribute the wireless sensor, that have sensor function, almost uniformly, it will be good enough to hold these wireless sensors in a holder at a constant distance. In other words, in order to locate the wireless sensors uniformly one-dimensionally, it will be good enough to fix the wireless sensors to the string holder at a constant distance.

In order to distribute the wireless sensors two-dimensionally, it can be realized, for example, by weaving wireless sensor holders in which the wireless sensors are held at a constant distance, vertically and horizontally.

The wireless sensor that are to be fixed to the string wireless sensor holder, may be filled in the string holder at a certain distance, or, the wireless sensors that have sensor function, may be filled in a hollow string holder at a constant distance, while the string holder is made to a hollow construction.

FIG. 1 depicts an embodiment of the string wireless sensor of the present invention. This string wireless sensor 11 comprises a string polymer 12 and wireless sensors 13, that are filled in this polymer. Said wireless sensors 13 are, for example, spherical elements of under 1 mm, in each of which a temperature sensor, a modulator that modulates the temperature signals measured by this temperature sensor and their position signals, and an antenna that transmits the modulated temperature signals and the position signals are included. Polymer 12 has a thermo-plasticity, by which the polymer can be melted by heating and solidified by cooling.

Figure 2:
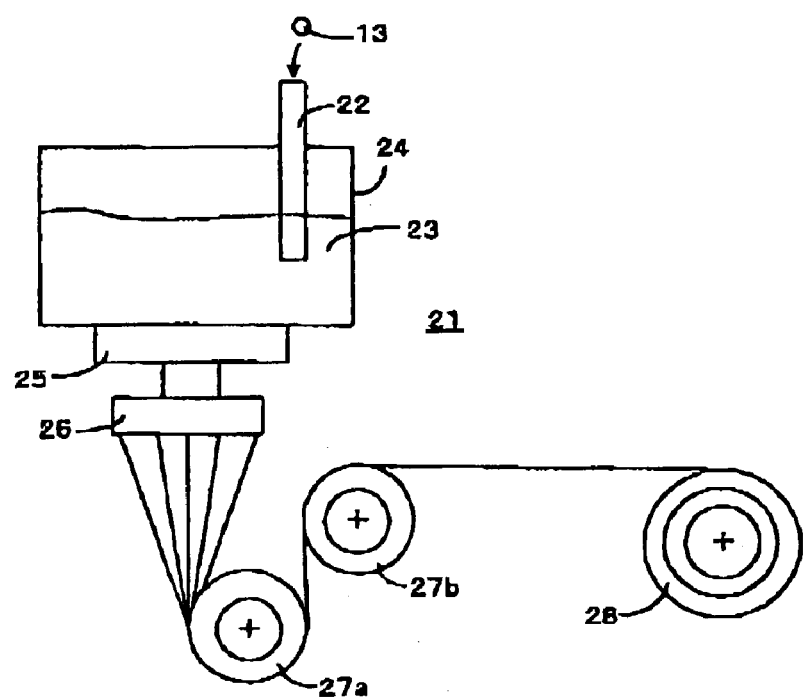
FIG. 2 is a drawing showing an example of the manufacturing method of the wireless sensor in accordance with the first embodiment of the present invention.

This string wireless sensor 11 is manufactured by a string wireless sensor manufacturing equipment 21 as shown in FIG. 2. This equipment comprises a tank 24, in which melting polymer is stored, and which is provided upward with a pipe 22, through which wireless sensors 13 are charged; a pump 25, which is provided downward on the bottom of this tank 24; a nozzle 26, through which the mixture of the melting polymer and the wireless sensors 13 delivered by the pump 25 is extracted threadlike and cooled; and a reel 28, which winds up the mixture extracted from the nozzle, through rollers 27a and 27b. By the string wireless sensor manufacturing equipment 2l as shown in FIG. 2, the string wireless sensor 11 of the construction as shown in FIG. 1 is produced and is wound up by the reel 28.

The process that the melting polymer 23 and wireless sensors 13 are extracted from the tank 24 by the pump 25, and further drawn threadlike from the nozzle 26 is same as normal filaturing process.

The distance of the wireless sensors located in the polymer 12 as shown in FIG. 1 is adjusted by the quantity of wireless sensors 23 that are charged into the melting polymer 23 in the tank 24 from the pipe 22, namely, by the density of the wireless sensors 13 in the polymer in the tank 24. When the distance between the wireless sensors 13 should be shorten, more wireless sensors should be put into the melting polymer 23, and when the distance between the wireless sensors 13 should be extended, the quantity of wireless sensors 13, that are put into the melting polymer 23, should be reduced.

The string wireless sensor 11, that is produced in such a way, can be used by weaving as in the case of the normal fiber. For example, the string wireless sensor 11 can be used as the fiber for clothes, hats and caps, curtains, nets, stuffed robots and a like, so that healthy and safe products can be produced.

And then, when the products made of this string wireless sensors 11 are used, the temperature sensors in the wireless sensor 13 detects always temperature and transmits the signals of the temperature, the temperatures of the respective portions of the products made of the string wireless sensor, can be detected in three-dimensionally outsides and without any contact, if a receiver, that can receive the signals, is provided.

Figure 3:
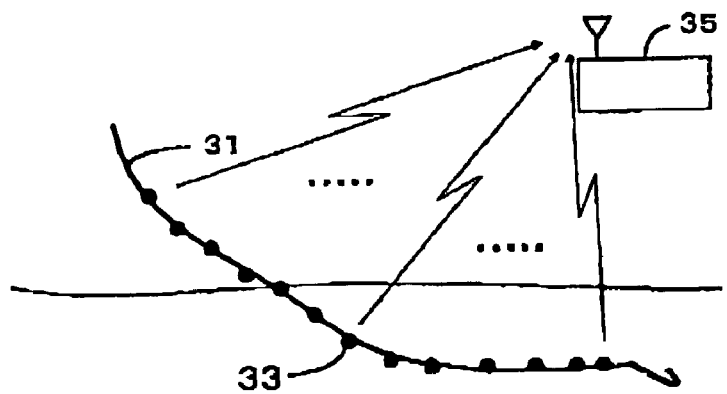
FIG. 3 is a drawing showing how to use the other embodiments of the present invention.

Also, if the coating material for fishing strings, ropes, electric cables, optic fibers is made of the string wireless sensors 11, the temperatures can be monitored along the longitudinal direction. In case that a wireless sensor 11 is used for a fishing string, the temperature sensors included in the wireless sensor 32 are distributed along the fishing string as shown in FIG. 3, the temperature signals from these wireless sensor can be received by a receiver 35. Therefore, by means of the wireless sensors 33 provided in the fishing string 31, the temperatures in the water can be detected, in the extent that the fishing string 31 extends.

Also when the string wireless sensors 11 are used as the strengthening material for motorcar tires, it is possible to measure the temperature of tires and accident by a overheated tire can be prevented by detecting and alarming the overheat of tire.

Figure 4:
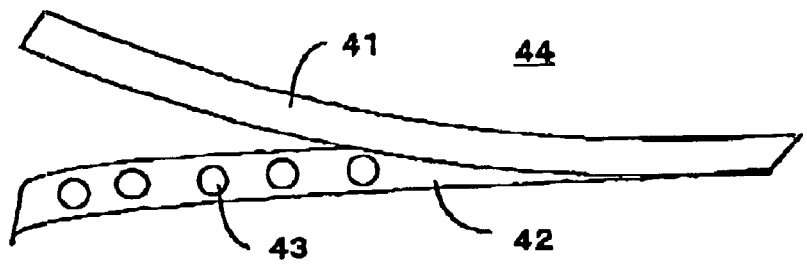
FIG. 4 is a drawing showing the construction of the string wireless sensor in accordance with another embodiment of the present invention.

Meantime, the string wireless sensor can be produced without using melting polymer as described in the above. For example, the wireless sensors 43 are inserted at a certain distances between the tapes 41 and 42, which are adhesive on one side, and are bound together as shown in FIG. 4, and then string wireless sensor 44, in which wireless sensors are held at a certain distance, can be produced.

Figure 5:
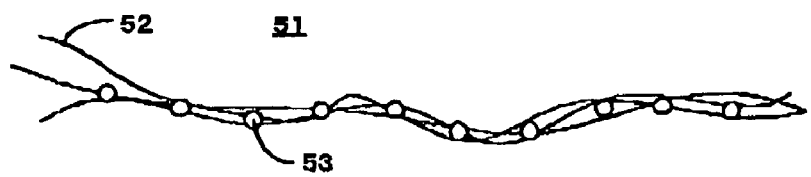
FIG. 5 is a drawing showing the string wireless sensor in accordance with further another embodiments of the present invention.

Also, string wireless sensor 51 can be produced by including the wireless sensors 53 in a plurality of stranded wires 52 as shown in FIG. 5. In this case, the stranded wires 52 may be made adhesive in advance so that the wireless sensors 53 can be held by adhesion.

Figure 6:
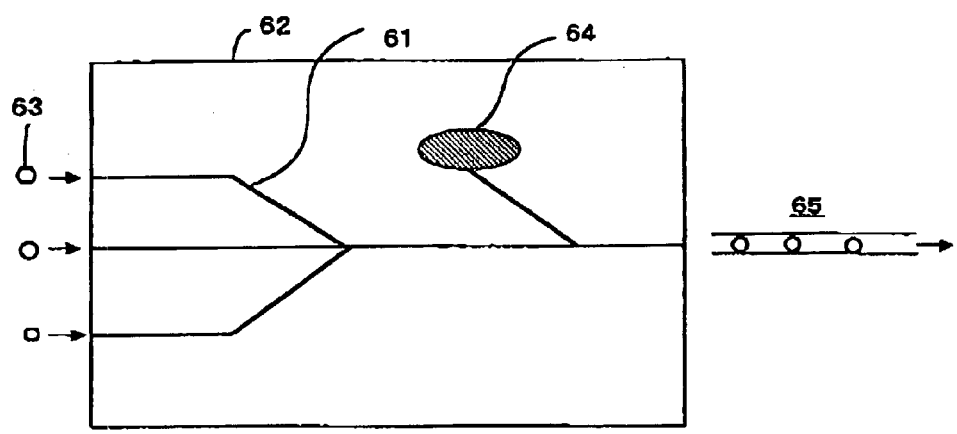
FIG. 6 is a drawing showing an example of the manufacturing method of the string wireless sensors in accordance with another embodiment of the present invention.

FIG. 6 depicts another manufacturing method for string wireless sensor. In this case, MEMS (Micro Electro Mechanical System) substrate, which is provided with flow-channels 61, is used. From one side of the flow-channels wireless sensors 63 are introduced, from the hollow 64, where the polymer solution is stored, the melting polymer is flown and from the other side the melting polymer is extracted, so that string wireless sensor 65, which involves wireless sensors 63 in polymer, can be manufactured.

Figure 7A:
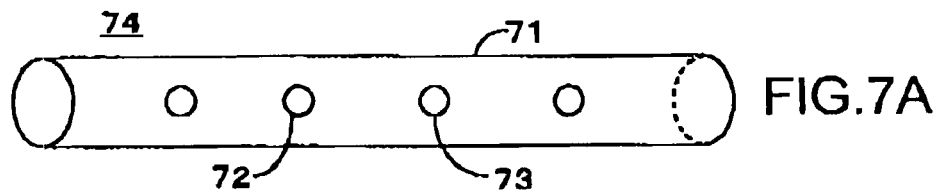
FIG. 7A and FIG. 7B are the drawings showing the string wireless sensor in accordance with further another embodiment of the present invention.

Also, in accordance with the present invention, it is also possible to provide wireless sensor with a function, that detects light and convert the same to electric signal, not only the wireless sensors that detect temperatures. An example as shown in FIG. 7A shows a string wireless sensor 74, in which, besides light emitting particles 72, wireless sensors 73, that are provided with a function to convert the light to electric power, in almost center of the optic fiber made of plastic, namely, in the core of the optic fiber, at a certain distance. In this embodiment, when a ray of light incident from one side of the optical fiber 71, the light emitting particles 72 emit light; the wireless sensor 73 receives the light and converts it to electric signals; and transmits the electric signals to a wireless receiver which is not shown in the drawing. Therefore, the strength of the light that incidents on the optical fiber is detected by the wireless sensors and the strength of light can be detected by the receiver located at a distance as an electric signals.

Figure 7B:
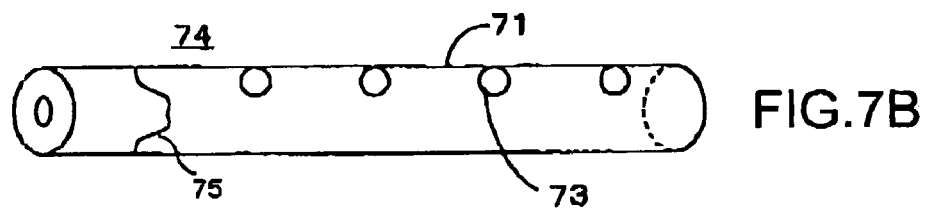

Furthermore, as shown in FIG. 7B, by providing the wireless sensors 73, that are to be provided within the optical fiber 72, in the cladding part remote from the center, the size of evanescent electromagnetic field at the cladding part can be detected. Meantime, in this drawing, the curve 75 shows the size of refractive index within the optical fiber 72.

Figure 8:
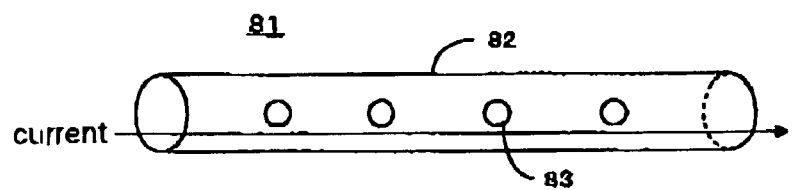
FIG. 8 is a drawing showing the string wireless sensor in accordance with further another embodiment of the present invention.

As shown in FIG. 8, by constructing the string wireless sensor 81 so that wireless sensors 83 are distributed at a certain distance in a conductive polymer 82, the string wireless sensor 81 can be used as an electric wiring between the wireless sensors 83, when the current is applied, and the string wireless sensor 81 can be also used as sensor IC-tube, that detects the electric field, magnetic field or radioactive wave, by detecting the strength of the current and the voltage by the wireless sensors.

Figure 9:
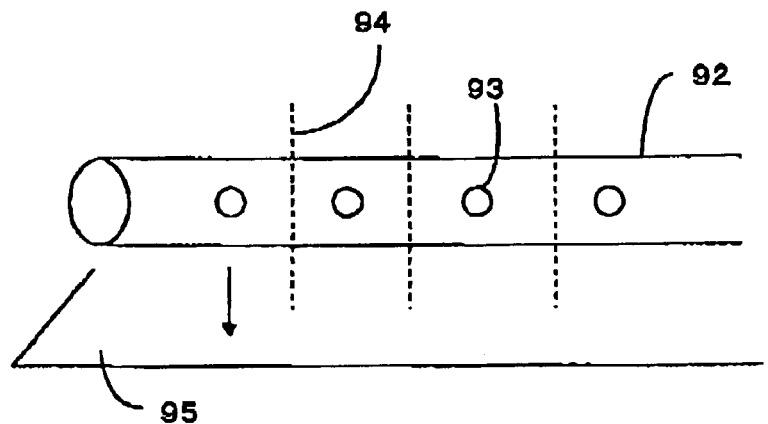
FIG. 9 is a drawing for explaining how to use further another embodiment of the present invention.

Also, the wireless sensors that are distributed in the string wireless sensor, can be used separately one by one. For example, as shown in FIG. 9, the wireless sensors 93 are located at a certain distance in polymer 92, that melts by heat and has adhesiveness, so that the string wireless sensor 92 can be cut at the positions 94 indicated by a broken line with a certain distance. Therefore, such a string wireless sensor 92 is cut from the end for each unit by heating with an iron and can be fixed on the edge of a piece of paper 95 by heating and melting. When a temperature sensor is involved in the wireless sensor 93, the surface temperature of the paper can be detected.

Also, when a transmitter that advises the position to the wireless sensor is included, the present position of the article, which is attached with a wireless sensor, can be detected, so that the positions of the articles can be traced easily, by receiving the electric wave transmitted by the wireless sensor.

Figure 10:
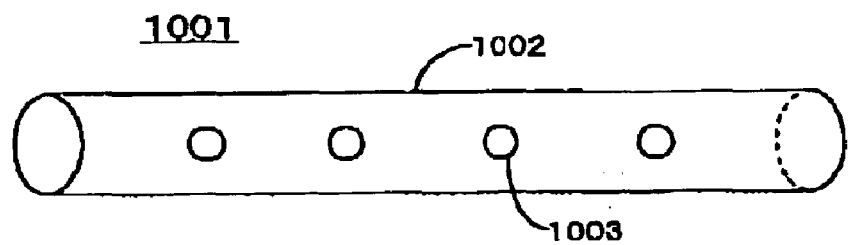
FIG. 10 is a drawing showing the string wireless sensor in accordance with further another embodiment of the present invention.

Also, the wireless sensors can be located in a elastic material. In the case of the string wireless sensor 1001 in FIG. 10, spherical particles of wireless sensors 1003 are located at a certain distance in a elastic material such as rubber 1002.

Figure 11:
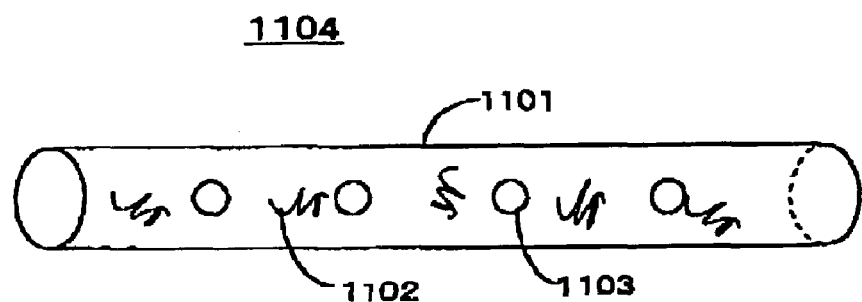
FIG. 11 is a drawing showing the string wireless sensor sheet in accordance with further another embodiment of the present invention.

Also, as shown in FIG. 11 a string wireless sensor 1104 is produced by locating carbon-nano-coil 1102 and spherical particles of wireless sensors 1103 in polymer 1101. In this case, when radio-wave of, for example, 5 GHz received at carbon-nano-coil 1102 can be received through an inductive coupling by a receiver provided in the wireless sensor, the string wireless sensor can be used as an antenna that can receive radio-wave easily.

Similarly, by distributing wireless sensors, each of which involves an optical sensor therein, in a plastic fiber (scintillation fiber), that emits a fluorescence through reciprocal action with radioactive rays, a radioactive rays monitor can be made. Also, if fluorescent particles and the wireless sensors, each or which involves a sensor for the particles, are mixed and put into the fiber, optical amplification is enabled, ultraviolet ray can be excited, so that position detection can be realized and the sensors in the wireless sensors mentioned in the above can be charged with electricity by light.

Also, a string wireless sensor, that detects pressure, can be manufactured by including wireless sensors, that involve photo-sensors or temperature-sensors, in a special polymer fiber that emits light or rises its temperature, when a pressure is applied.

Furthermore, this string wireless sensor can be attached to metallic surface, if magnetic particles and wireless sensors, that involve particle-sensors, are mixed and included in a fiber.

Figure 12:
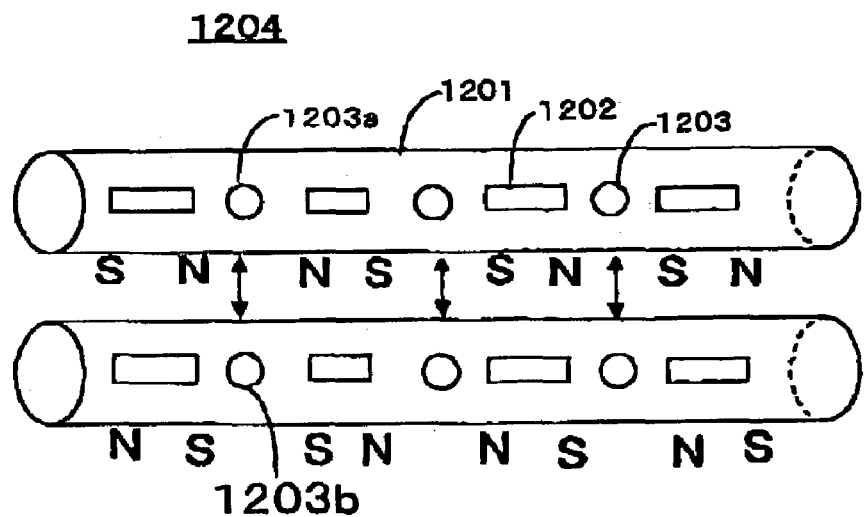
FIG. 12 is a drawing showing the string wireless sensor in accordance with further another embodiment of the present invention.

When a string wireless sensor 1204 is made by distributing micro magnets 1202 and spherical wireless sensor 1203 in a fiber 1201, as shown in FIG. 12, then it is possible to encode the micro magnets and also it is possible, for example, to lay wireless sensor 1203*a*, that involves temperature sensors, and the wireless sensors 1203*b*, that involves photo-sensors, near by each other, by having them adsorbed each other at a special position using s string wireless sensor 1204.

Figure 13A:
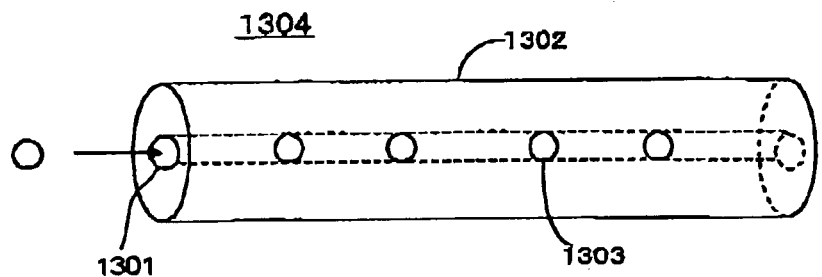
FIG. 13A and FIG. 13B are drawings showing the string wireless sensor of the further another embodiment of the present invention.

As to manufacturing method of the string wireless sensor method mentioned in the above, as shown in FIG. 13A, a string wireless sensor 1304 can be produced by putting spherical wireless sensors 1303 into the aperture 1301 of a plastic 1302, that is provided with a aperture 1301 in the center and that shrinks when heat is applied, after the spherical particles of wireless sensors 1303 are moved by means of air pressure or water pressure in the aperture 1301. Or, also it is possible to detect temperature by the temperature-sensors involved in the wireless sensor, while the wireless sensor 1303 is not fixed but are kept movable in the aperture by means of air pressure or water pressure.

Figure 13B:
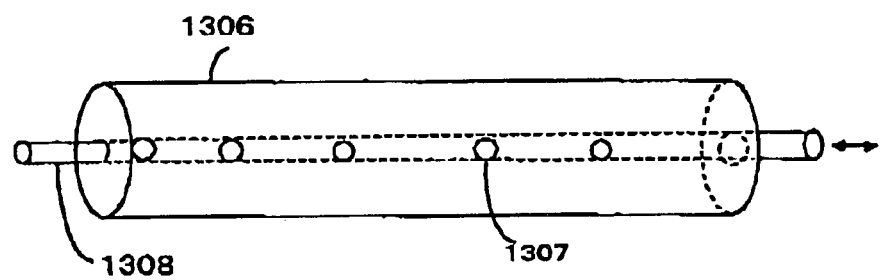

Furthermore, as shown in FIG. 13B, the string wireless sensor 1308 in which spherical wireless sensors 1307 are located in the hollow pipe 1306 at a certain distance can be move, so that the position which the sensor involved in the wireless sensor 1307 detects can be changed.

Figure 14:
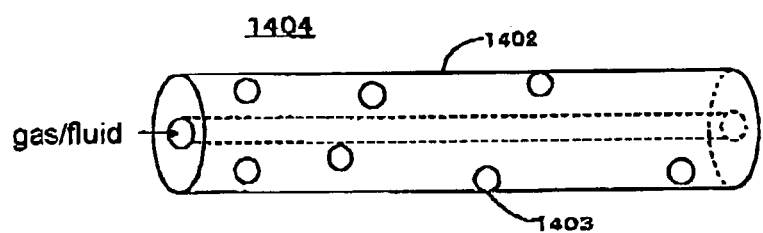
FIG. 14 is a drawing showing the string wireless sensor sheet of further another embodiment of the present invention.

Furthermore, as shown in FIG. 14, a string wireless sensor 1404, which can detect the temperature or pressure by means of temperature-sensor or pressure-sensor involved in the wireless sensor 1403, can be produced by including wireless sensors 1403 in the side wall 1402 of the hollow tube 1401. In this case, depending upon plastic extrusion process, when the pipe is produced, wireless sensors 1403 may mixed in the plastic.

Figure 15:
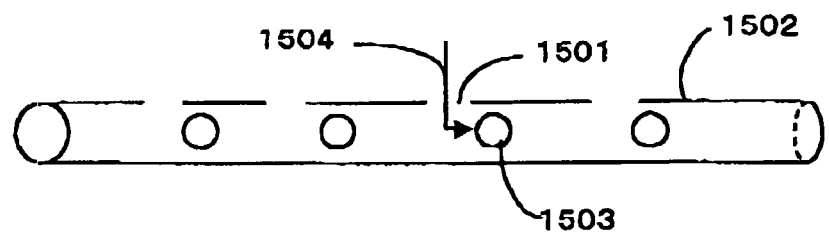
FIG. 15 is a drawing showing the construction of further another embodiment of the present invention.

Also, string wireless sensor, as shown in FIG. 15, can be produced by inserting spherical wireless sensors 1503 into the fine holes 1501b which are provided on the side wall of the pipe 1502 at a certain distance and have them moved in the arrow direction and then fixed.

Figure 16A:
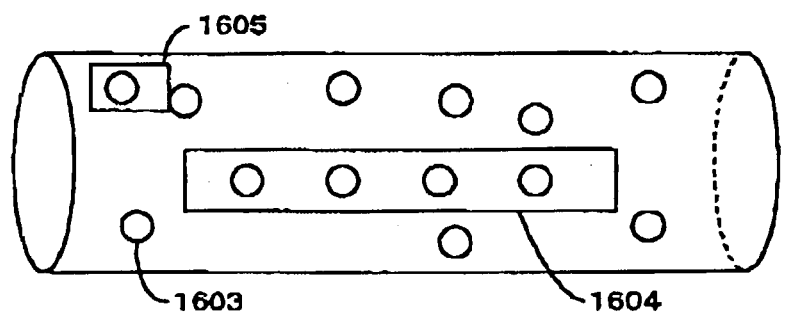
FIG. 16A and FIG. 16B are drawings showing the manufacturing method of the string wireless sensor in accordance with further another embodiment of the present invention.
Figure 16B:
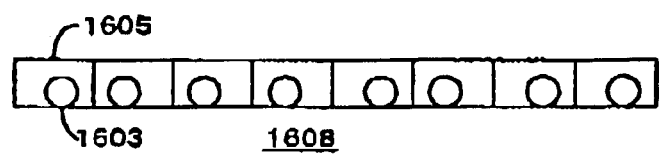

Also, as shown in FIG. 16, when the film for T-shaped die method and inflation method is prepared, spherical wireless sensors are mixed. The film is slit into string 1604, or, a several pieces of fine square pieces 1605 of the film which include wireless sensors are cut and then these pieces are connected each other so that a string wireless sensor 1608, in which wireless sensors 1603 are located at a certain distance, can be produced, as shown in FIG. 16(b).

Figure 17:
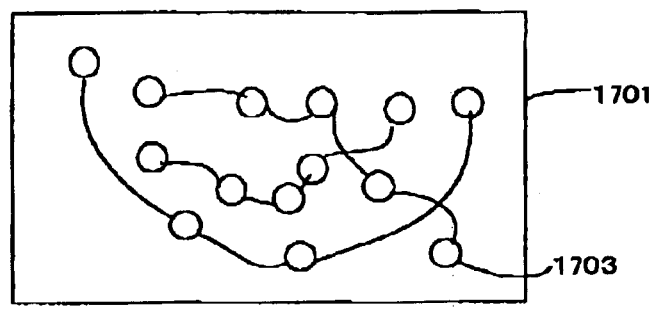
FIG. 17 is a drawing showing the construction of the string wireless sensor in accordance with further another embodiment of the present invention.

Also, as shown in FIG. 17, by locating spherical wireless sensors 1703 on the fix substrate 1701 and connecting theses wireless sensors by means of electromagnetic coupling, electronic circuit substrate, which design can be changed flexibly, can be manufactured.

Figure 18A:
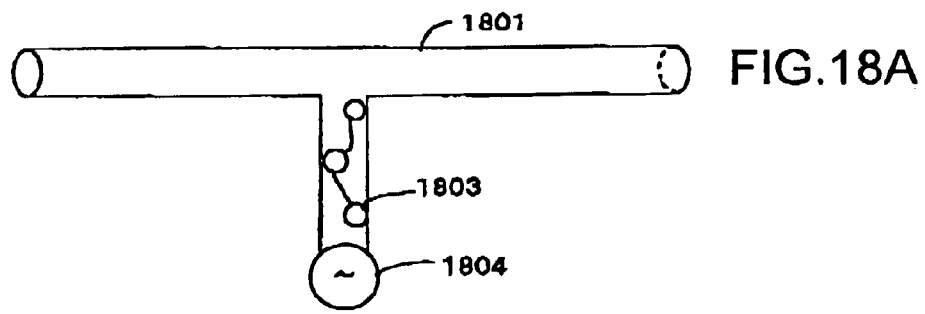
FIG. 18A and FIG. 18B are drawings showing the string wireless sensor in accordance with further another embodiment of the present invention.
Figure 18B:
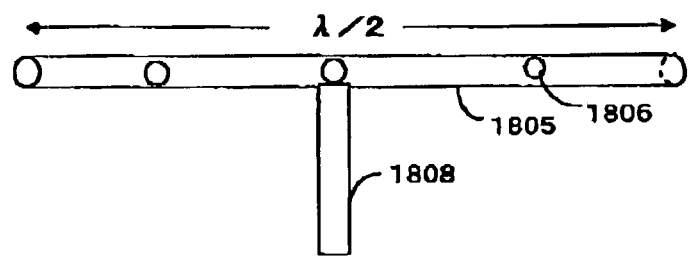

Also, as shown in FIG. 18A, when wireless sensors 1803 are put into an antenna 1801, and are connected electrically, the antenna can be used as an antenna which can receive a wide band electromagnetic waves and can process signals. Number 1804 indicates the transmitting station. Also, as shown in FIG. 18B, by inserting a wireless sensors 1806 into a conductive polymer 1805 of a length of ½ wavelength (λ). Meantime, the part 1808 is a support, the antenna can be used as a high sensitive dipole antenna.

Next, other embodiments are explained further. String wireless sensor 1901 shown in FIG. 19A is the one that fine sensor ICs as wireless sensors 1903 are included in a polymer fiber 1902. This wireless sensor 1903 is, as shown in FIG. 19B, provided with a sensor 1904; light-electric converting portion 1905; a circuit portion 1906 including a memory, a RF-circuit and a logic circuit; and further a coil 1907 for connecting electromagnetic fields. There is a case that a position sensor, that detects the position of the wireless sensor 1903 itself, is provided in the wireless sensor 1903.

An electric power is supplied from outside, and the signals caught by the sensor portion 1904 and a light-electric converter 1905 can be transmitted to outside as electric signals through this coil 1907. In case that a light exciting is performed by irradiation from outside, it is advisable to adopt a polymer fiber 1902 of transparent quality. Also, when a special polyester material that generates a high temperature, when the same absorbs water, is used as polymer fiber 1902, such string wireless sensor can be used as string water sensor for the case that water leaks.

In this invention, an antenna that can transmit electric signals to outside, while it is supplied with an electric power from outside, or, that can transmit electric signals obtained within wireless sensor, can be included in the string wireless sensor or provided on the surface of string wireless sensor. Such embodiments will be explained in below.

In the embodiment of the present invention shown in FIG. 20, fine sensor IC as a wireless sensor 2003 is included in a polymer fiber made of polystyrene 2004; and a conductive foil, which becomes an antenna 2005 by means of printed wiring, is provided on the surface of the polystyrene. Bump 2006 is made of conductive material, and is used for connecting the terminal of the wireless sensor 2003 and the antenna 2005. As described in the above, polystyrene 2004, on which surface an antenna 2005 is formed by printed wiring, is coated with polystyrene and forms a string wireless sensor 2001.

Though not shown in the drawing, the wireless sensor 2003 is incorporated with a light-electric-converter comprising a sensor portion comprising a sensor portion detecting temperature and position, a RF-circuit, a logic circuit and a PN-connection. The electric signals obtained by the wireless sensor 2003 are transmitted to outside through bump 2006 by the antenna 2005.

In the embodiment shown in FIG. 21, the wireless sensor 2103 is inserted into a hollow tube 2104 of a very fine diameter made of polymer. The terminals of the wireless sensor 2103 in the pipe 2104 are connected to the antenna 2107 provided by printed wiring on the surface of the pipe 2104 through the hole 2106 provided in the side wall of the pipe 2104, so that the string wireless sensor 2101 is formed. In the wireless sensor 2103, though not shown in the drawing, a light-electric converter comprising a sensor portion, a RF-circuit, a logic circuit and a PN-connection is included. The space other than the wireless sensor 2103 in the pipe 2104 may be filled up with an insulation material such as polystyrene, or may be left as a hollow state.

The electrical signals obtained at the sensor portion and the light-electric converter in the wireless sensor 2103 are transmitted to outside through a lead wire 2105 by the antenna 2107.

Meantime, in this embodiment, if two sorts of proper metals, which can form a thermocouple, are used for the antenna 2107 and the lead wire 2105, it is possible to detect temperature at the both ends of the antenna 2107.

Figure 22:
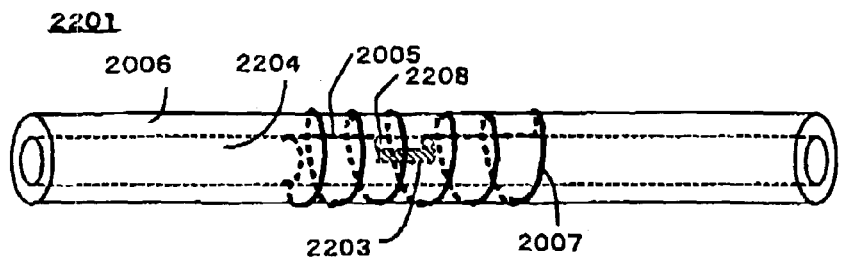
FIG. 22 is a drawing showing the string wireless sensor sheet in accordance with further another embodiment of the present invention.

FIG. 22 shows further another embodiment of the present invention. In this embodiment, as similar to the embodiment shown in FIG. 20, a wireless sensor 2203 comprising a fine IC is included in a polymer fiber made of polystyrene 2204 and a conductive foil forming an antenna 2205 is provided by means of printed wiring on the surface of the polystyrene fiber. The printed wiring on the surface is coated with polystyrene 2206, and further the coated fiber is provided with a coil 2207 made of a conductive foil spirally by rotary printing on the surface, and then the outside terminals of the wireless sensor 2203 are connected to the antenna 2205 and the coil 2207 through the bump 2208. Though not shown in the drawing, the wireless sensor 2203 is incorporated with a light-electric converter comprising a sensor portion, a RF-circuit, a logic circuit and a PN-connection. The electrical signals obtained by the sensor portion and light-electric converter in the wireless sensor 2203 is transmitted to outside by the coil 2207.

Figure 23:
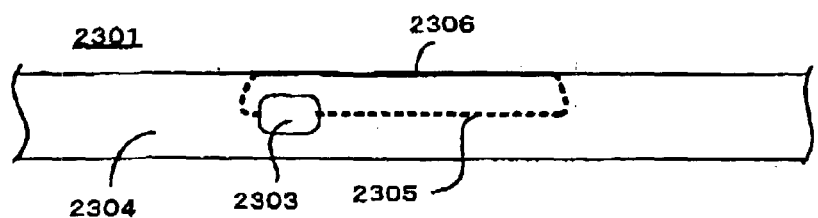
FIG. 23 is a drawing showing the string wireless sensor in accordance with further another embodiment of the present invention.

FIG. 23 shows further another embodiment of the present invention. In this embodiment, the wireless sensor 2303 is included in the electric cable 2304 of a fine small diameter and the core conductor 2105 is connected to the antenna 2306 provided on the outer surface of the electric cable 2304 by printing wiring on the way, so that the string wireless sensor 2301 is formed. Though not shown in the drawing, the wireless senso 2303 is incorporated with a light-electric converter comprising a sensor portion, a RF-circuit, a logic circuit and a PN-connection. The electric signals obtained by the sensor portion and light-electricity converter portion are transmitted to outside of the coil 2306.

Figure 24:
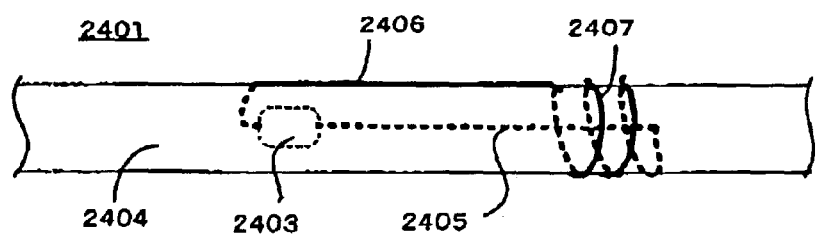
FIG. 24 is a drawing showing the string wireless sensor in accordance with further another embodiment of the present invention.

FIG. 24 shows further another embodiment of the present invention. In this embodiment the wireless sensor 2403 is included in a electric cable 2404 of a very fine diameter, the core conductor 2405 is connected to the antenna 2406 and the coil 2407 which are provided on the outer surface of electric cable by printed wiring on the way, so that the string wireless sensor 2401 is formed. Though not shown in the drawing, the wireless sensor 2403 is incorporated with a light-electric converter comprising a sensor portion, RF-circuit, logic circuit and PN-connection. The electrical signals obtained by the sensor portion and light-electric converter are transmitted to outside by the antenna 2406 and the coil 2407.

Though in the embodiments shown in from FIG. 20 to FIG. 24, only one wireless sensor in a string wireless sensor is shown, a plurality of wireless sensor are located at a certain distance actually in anyone of the embodiments. Also, the wireless sensors in these embodiments can be supplied with an energy from outside and the electrical signals obtained by the sensor portion can be transmitted to outside as data.

Figure 25:
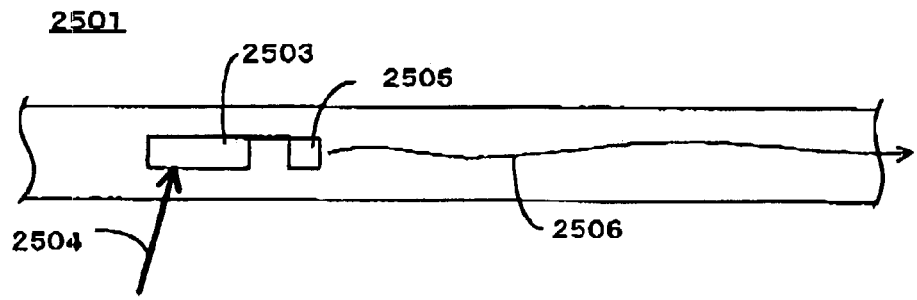
FIG. 25 is a drawing showing the construction of the string wireless sensor sheet in accordance with further another embodiment of the present invention.

FIG. 25 shows still further another embodiment of the present invention. Referring to the drawing, in a plastic optical fiber (POP) 2502, which is a transparent polymer fiber, are included, a wireless sensor 2503 comprising a fine IC and a LED 2505 are connected each other and included therein as a set. The wireless sensor 2503 is incorporated with a light-electricity converter comprising a sensor portion, a RF-circuit, a logic circuit and a PN connection as well as a transmitter that changes frequency depending upon the temperature (explained later), so that a string wireless sensor 2501 is formed.

When the wireless sensor 2503 is irradiated with a optical beam 2504 as a exciting optical beam from outside, an electricity is generated at the light-electric converter and the power is supplied. The temperature signals are again changed to optical signals at the light-electric converter, and the optical signals are transferred through a plastic optical fiber (POF) 2502. The wireless sensor 2503 comprises a sensor portion, the detected signals obtained at the sensor portion are piled up as electrical signals and drives the LED 2505. Therefore, the detected signals obtained at the sensor portion are carried on the optical signals emitted by the LED 2505 and transferred through POF 2502.

Figure 26:
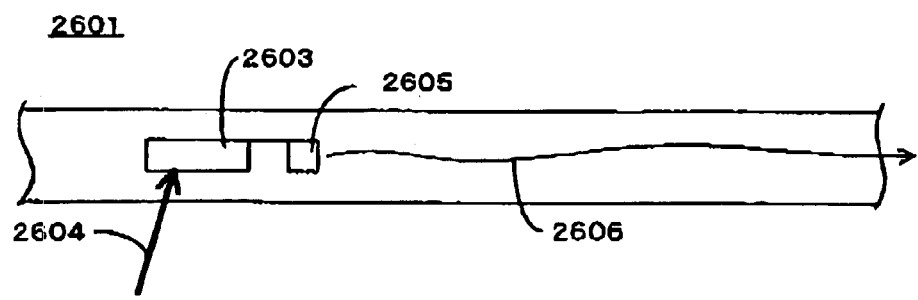
FIG. 26 is a drawing showing the string wireless sensor in accordance with further another embodiment of the present invention.

FIG. 26 shows furthermore another embodiment of the present invention. Referring to the drawing, in a plastic optical fiber made of a transparent polymer fiber (OPF) 2602, a wireless sensor 2603 comprising a fine IC and a LED 2605 are included as a connected set. In the wireless sensor 2603, a light-electric converter comprising a sensor portion, a RF-circuit, a logic circuit and a PN-connection and a transmitter that changes the frequency depending upon temperature are incorporated so that a string wireless sensor 2601 is formed. The wireless sensor 2603 is applied with am excited electromagnetic field 2604 from outside. By the application of this excited electromagnetic field, an electric power is supplied from outside. The electric power drives the LED 2605 and the temperature data are again converted into optical signals, which are transferred through the POF 2602.

The wireless sensor 2603 comprises a sensor portion. The detected signals obtained by the sensor portion are carried on the electrical signals, which are inputted in LED 2606. Therefore, it means that the detected signals obtained by the sensor portion are carried on the optical signals, which are transferred through POF 2602.

Figure 27:
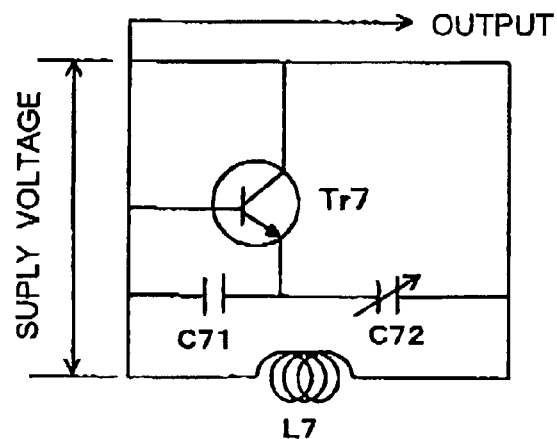
FIG. 27 is a drawing showing an example of the transmitter used by one of embodiments of the present invention.

FIG. 27 shows COLPITS oscillator as an example of the oscillating circuits in which ht frequency depends on temperature. Referring to the drawing, condensers C71 and C72 are connected to the transistor Tr7 as the base, and a coil L is connected to the other ends of the condensers. In this connection, the condenser 72 is a variable capacity diode depending on temperature.

The frequency $f = 1/2\pi(L \times C)^{1/2}$ where $C = C71 \times C72(C71+C72)$ When C71 is very large compared to C72, the emitting frequency f is almost $1/2\pi(L7 \times C2)^{1/2}$ and C7 is proportional to $T^{-1/2}$. This is introduced, for example, on Page 79 and Page 249 of "Physics of Semiconductor Device" written by S. M. Sze.

By including the oscillating circuit shown in FIG. 27 in the wireless sensor 2503 and 2603, it is possible to change the oscillating frequency depending on temperature.

Figure 28:
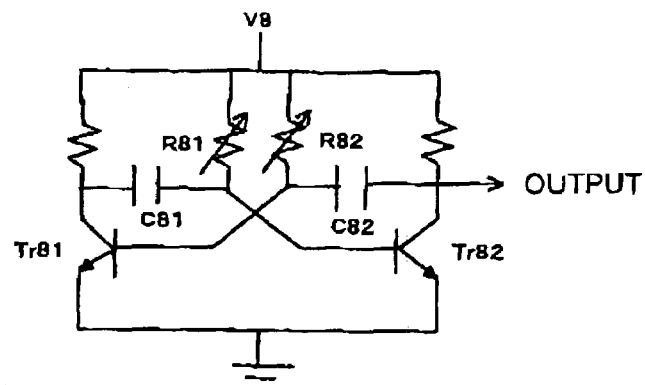
FIG. 28 is a drawing showing another example of the transmitter used by one of embodiments of the present invention.

FIG. 28 shows an example of the circuit that the oscillating frequency changes depending on temperature. This circuit is a non-stable-multi-vibrator comprising two transistors Tr81 and Tr82, two condensers C81 and C82, two resistors depending on temperature R81 and R82 and two fixed resistances. The cycle T of the pulse in the circuit is given by $T = 0.693(C81 \times R81 + C82 \times R82)$.

In this connection, resistances R81 and R82 are assumed as variable resistances depending on temperature. By this arrangement, when the temperature changes, the period of the non-stable multi-vibrator changes and the oscillating frequency changes. By including the oscillating circuit as shown in FIG. 28 in the wireless sensor 2503 and 2603 as shown in FIG. 25 and FIG. 26, it is possible to change the oscillating frequency by temperature.

Figure 29:
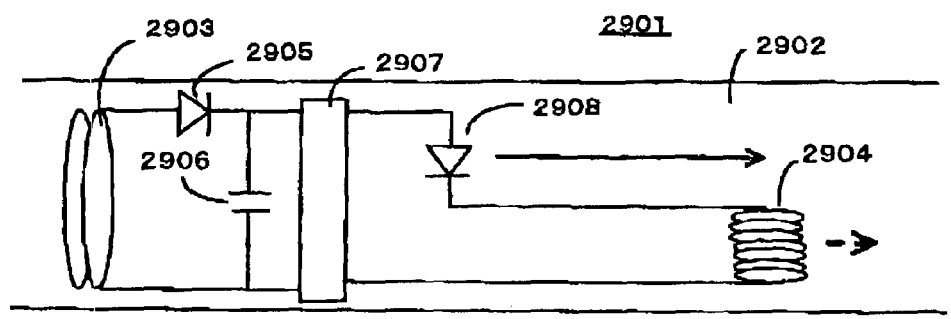
FIG. 29 is a drawing showing the string wireless sensor in accordance with further another embodiment of the present invention.

In the meantime, for example, it is possible to transmit temperature data as optical signals and perform the supply of the electric power through electromagnetic connection. FIG. 29 shows such an embodiment. This part is included in a plastic optical fiber (POF) which is a transparent polymer fiber. This part comprises a electromagnetic coils 2903 and 2904, a Schottky-barrier diode 2905, a condenser 2906, an oscillator 2907 and a LED 2908.

The Schottky-barrier diode 2905 is provided for rectifying AC induced by the electromagnetic coil 2903, and this diode and the condenser 2906 compose a smoothing circuit. The oscillator 2907 is an oscillator, in which oscillating frequency changes depending on temperature. It is possible to transfer optical signals emitted by the LED 2908 through POF 2902 and on the other hand, to transfer an electric power to the electromagnetic coil located nearby through the electromagnetic coil 2903 by means of electromagnetic field.

Figure 30:
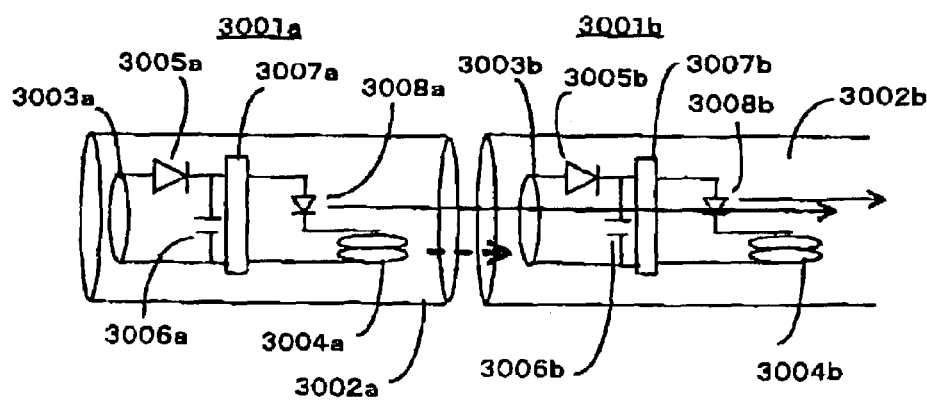
FIG. 30 is a drawing showing an example of the modes of the electric power and optical transmission of data at the end surface of the string wireless sensor sheet, when the wireless sensor shown in FIG. 29 is used.

FIG. 30 shows the mode of transfer of optical signals and supply of electric power at the position where two wireless sensors are connected. Referring to the drawing, the numbers 3001a–3008a and the numbers 3001b–3008b correspond to the numbers 2901–2908 in FIG. 29.

Figure 31:
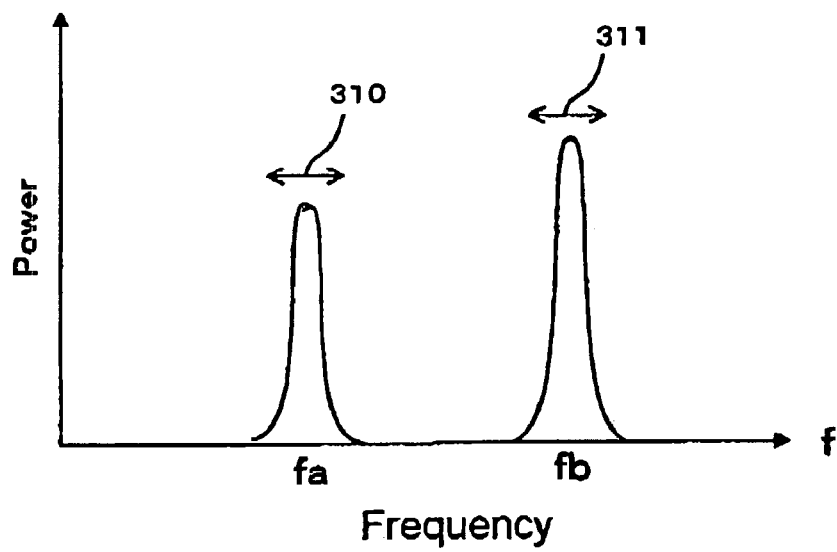
FIG. 31 is a drawing for explaining that data transmission frequency changes by changes of temperature in case of the embodiment of the present invention shown in FIG. 30.

On the other hand, the electric signals of the transmitter 3007b in the string wireless sensor 3001 are transferred to the LED 3008b and the optical signals emitted by the LED 3008 are also transferred rightwards. The basic oscillating frequency of the transmitter 3007a is assumed as fa and the basic oscillating frequency of the transmitter 3007b is assumed as fb. As the oscillating frequency of the transmitter 3007a changes depending on the temperature of this wireless sensor and oscillating frequency of the transmitter 3007b also changes depending on the temperature of another wireless sensor, oscillating frequency of the transmitter changes. As shown by the arrows 310 and 311 in FIG. 31, transmitting frequency of the transmitter changes depending on temperature of the electric signals emitted by the transmitter 3007a, which depends on temperature, is transferred to the LED 3008a. The optical signals emitted by the LED 3008a includes the data of temperature, this optical signals are transferred through POF 3002a and further to POF of the string wireless sensor 3001b rightwards.

The optical signals emitted by the LED 3008a includes variations of the oscillating frequency of the transmitter 3007a. On the other hand, the optical signals emitted by the LED 3008b includes variations of the frequency of the transmitter 3007b. Therefore, by detecting the deviation of the optical signals emitted by the LED 3008b and the deviation of the optical signals emitted by the LED 3008b, it is possible to detect the temperatures at the respective wireless sensors.

In general, by incorporating a transmitter, which oscillating frequency changes depending on temperature, in the wireless sensors which are located in the string wireless sensor at a certain distance, it is possible to obtain the temperatures at the respective wireless sensors by detecting the optical signals emitted by the LEDs in the respective wireless sensors, and by detecting the deviation of the frequency. In other words, it is possible to detect the temperatures at the respective wireless sensors by providing an optical receiver on one end of the string wireless sensor, by separating the optical signals by means of frequencies and by detecting the deviation of the frequencies from the basic frequencies.

In this case, if the optical signals are transmitted including the position information of the wireless sensors from the respective wireless sensors, the temperatures of the respective positions can be detected. When the information of the positions are not transmitted, if the number of the wireless sensors or the distance of these wireless sensors are known, the positions of the respective wireless sensors can be assumed and the temperature distribution can be obtained.

On the other hand, an electromagnetic field is formed by the electromagnetic coil 3004a and an electromotive force is induced at the electromagnetic coil 3003b by this electromagnetic filed. This induced electromotive force is rectified by a smoothing circuit comprising Schottky-barrier diode 3005b and a condenser 3006 and is supplied to the transmitter 3007b. In such a way, the electric power is transferred.

Figure 32:
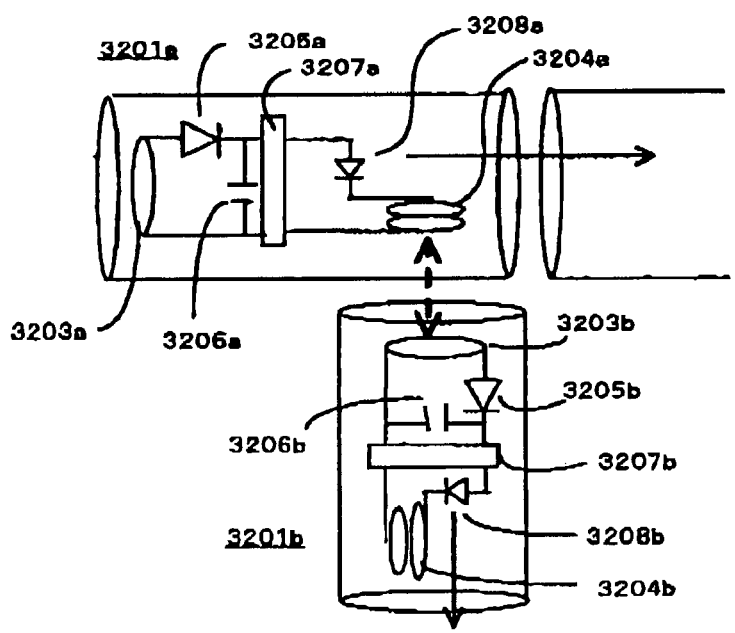
FIG. 32 is a drawing for explaining an example of the mode that an electric power is transmitted to another string wireless sensor by means of electromagnetic field using the string wireless sensor shown in FIG. 29.

Meanwhile, in the embodiments mentioned in the above, electric power is transferred from the end surface of the string wireless sensor. However, it is also possible to supply the electric power from the point on the way of string wireless sensor to the wireless sensors in an other string wireless sensor. The constitution of such an other embodiment of the present invention is shown in FIG. 32. In FIG. 32, the numbers 3201a–3208a and the numbers 3201–3208b correspond to the numbers 2901–2908 in FIG. 29. In this case, an electromagnetic field is generated by the electromagnetic coil 3204a and electromotive force is generated at the electromagnetic coil 3203b by this electromagnetic filed. This electromotive force is rectified by a smoothing circuit comprising Schottky barrier diode 3205b and a condenser 3206b, and supplied to the transmitter 3207b. The output of this transmitter is led to the electromagnetic coil 3204b and an electromagnetic field is formed.

On the other hand, as the oscillating frequency of the transmitter 3207b changes depending on temperature, the frequency of the optic signals of the LED 3208b, which is supplied with this electric power, causes deviations of the frequency. The temperature at the transmitter 3207b can be detected, by receiving this optical signals.

It is possible to arrange the wireless sensors two-dimensionally by locating and fixing the string wireless sensors, in which such wireless sensors are located at a certain distance, vertically and horizontally. For example, such string wireless sensors are provided vertically and horizontally on the ceiling 3301, wall 3302, curtain 3303, floor 3304, bed 3305. Then, the wireless sensors located in the string wireless sensor are arranged in a plane.

Also, if the clothes 3306 for the human are woven using the string wireless sensors, wireless sensors are located on the curved surface along the human body.

Figure 33:
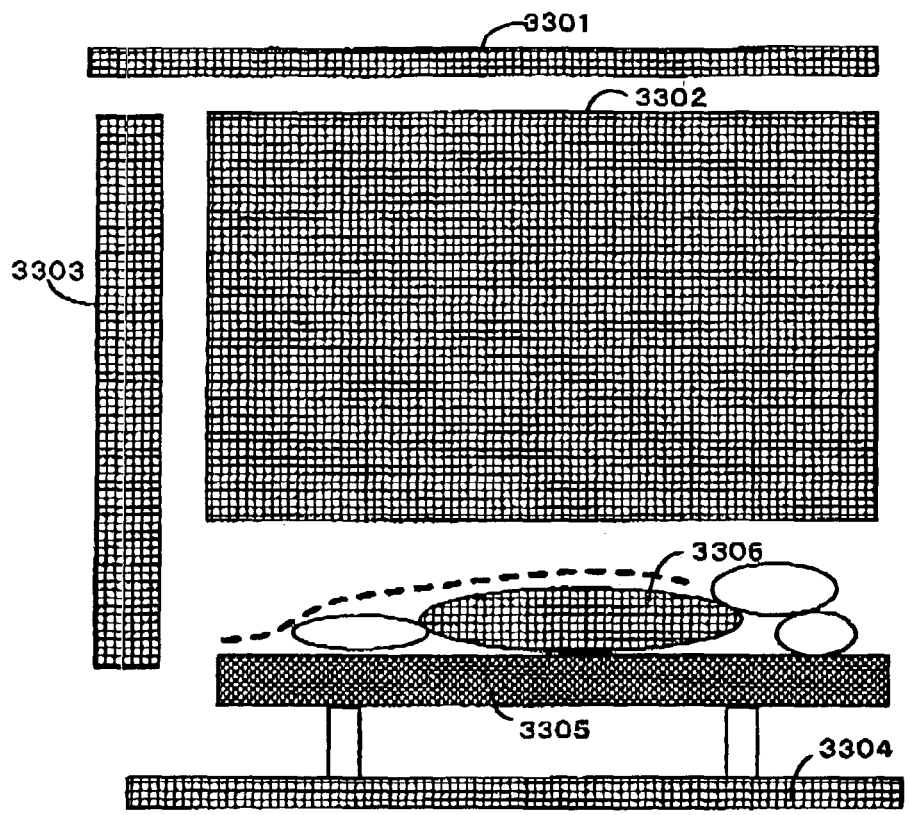
FIG. 33 is a drawing showing an example of the case that the string wireless sensors in accordance with present invention are provided two-dimensionally.
Figure 34:
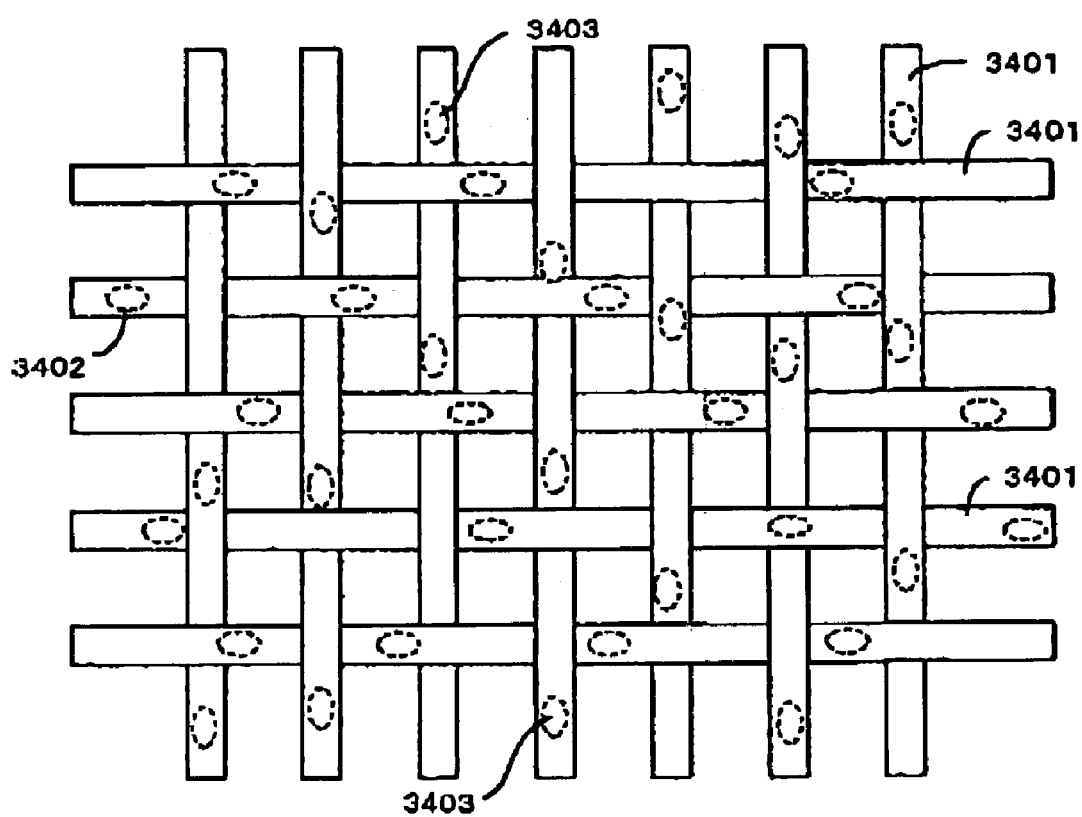
FIG. 34 is a drawing for explaining the location of the wireless sensors, when the string wireless sensors in accordance with present invention are involved.

For example, if the curtain 3303 shown in FIG. 33 is woven using the string wireless sensors, the curtain will be as shown in FIG. 34. In other words, the string wireless sensors 3401 are woven vertically and horizontally, the respective wireless sensors 3403 are located two dimensionally. Then the wireless sensors in these string wireless sensors are provided with a device, which changes the data of temperature and position to optical signals and light receiving devices are located at the respective ends of the string wireless sensors. Then, temperature at the respective positions can be detected. And, as a whole, two-dimensional temperature distribution can be obtained vertically in the room.

By means of string wireless sensors provided on the ceiling 3301, a two-dimensional temperature distribution at the ceiling of the room can be obtained. By means of string wireless sensors provided in the clothes 3306, a two-dimensional temperature distribution on the surface of the human body can be obtained.

Meantime, if the string wireless sensors are located vertically and horizontally, for example by weaving, the adjoining string wireless sensors can be located at a certain distance both vertically and horizontally and thus the location can be made easily advantageously.

However, according to the present invention, it is not always necessary to locate both vertically and horizontally. For example, a plurality of string wireless sensors may be located only vertically separately each other at a certain distance.

Figure 35:
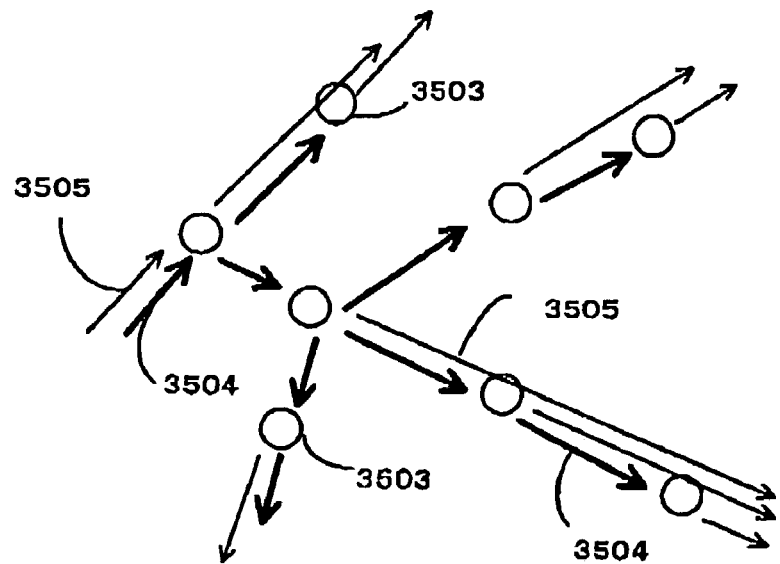
FIG. 35 is a drawing for explaining the mode of the transfer of the information and the electric power, when the wireless sensors shown in FIG. 29 are used.

By the way, in case that electric power (energy) and optical signals are transferred as the data as shown in FIG. 30 and FIG. 32, if the wireless sensors 3503 are located two-dimensionally at a certain distance as shown in FIG. 35, the electric power is transferred in the direction shown by the arrow 3504, and the optical signals are transferred to the direction shown by the arrow 3505. In this case, the optical signals transmitted by the respective wireless sensors are transferred only in one direction. In this case, the energy is supplied from a wireless sensor to the other adjacent wireless sensor. The optical signals emitted by the respective wireless sensors are transferred just in one direction.

Further in general, if the wireless sensors are located two-dimensionally at a certain distance, electric power (energy) is supplied from one of the wireless sensors to the other wireless sensor as shown by the arrow 3604. Also, the data such as temperature obtained from the wireless sensors are collected as data as shown by the arrow 3605 and are transferred to other wireless sensor. The wireless sensor in this case functions as the data connection point that receives once the data transferred from the other wireless sensor and again transfers the same to the other wireless sensor.

Figure 36:
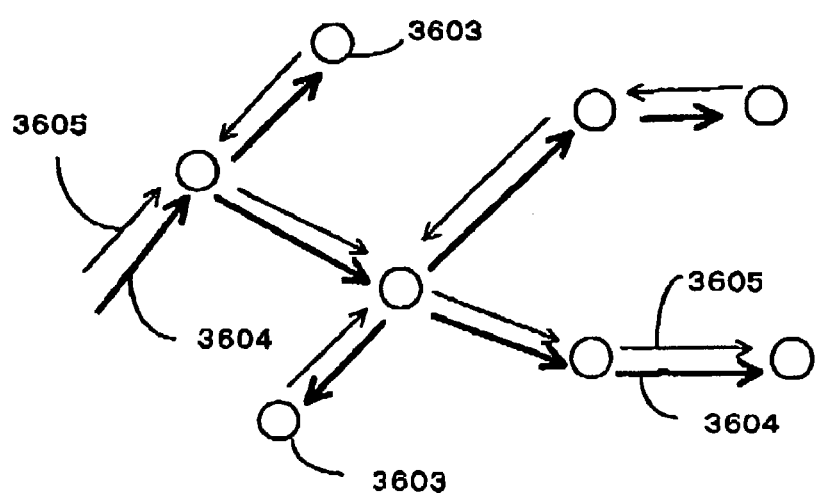
FIG. 36 is a drawing for explaining the mode of the transfer of data and electric power, when the string wireless sensors are located two-dimensionally
Figure 37A:
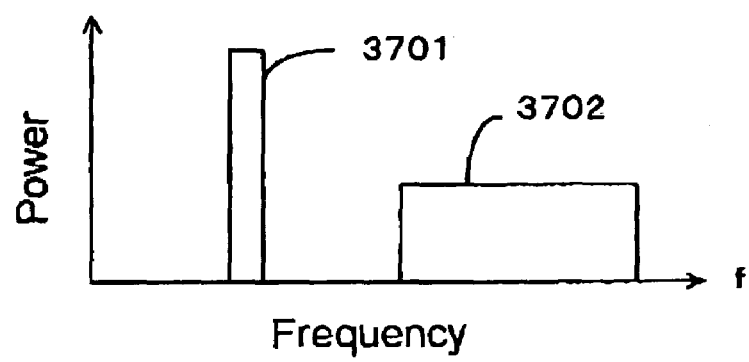
FIG. 37A and FIG. 37B are drawings for explaining the mode of transfer of information and electric power by means of the string wireless sensor of the present invention.
Figure 37B:
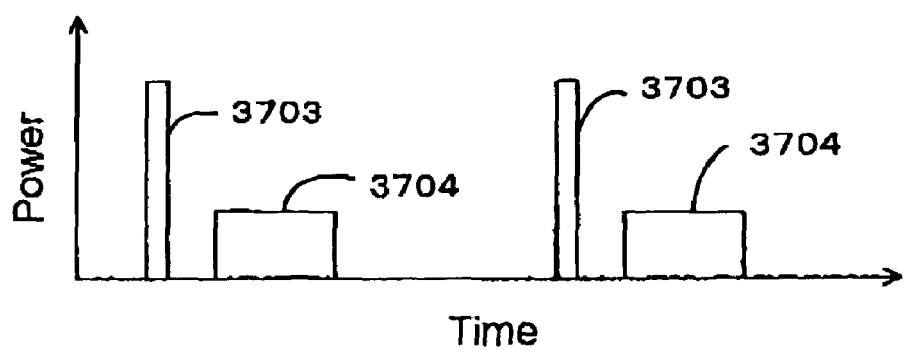

In the case as shown in FIG. 36, there are two methods to transfer the energy and information data separately: The method by means of frequency and the method to divide timing for transfer. FIG. 37A shows the method to separate frequency 3701 for transferring energy and frequency range 3702 for transferring data. FIG. 37B shows the method to change timing for transferring the pulse 3703 for transfer of energy and for transferring the pulses 3704 for data transfer. According to the present invention, either method for separating the energy transfer and the data transfer may be used the frequency separating method and the timing separating method mentioned in the above.

Figure 38:
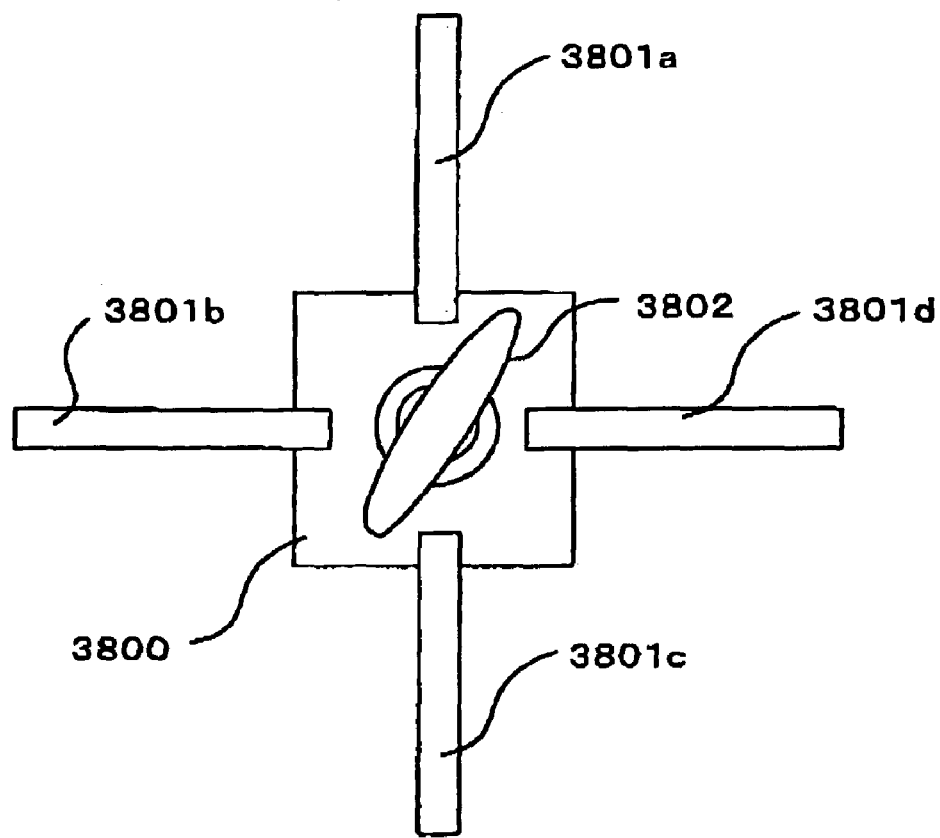
FIG. 38 is a drawing showing the information (data) base unit in accordance with present information.

In this connection, a data base unit, which collects the signals from the respective wireless sensors in a plurality of the string wireless sensor and transmits the collected data to outside, is explained. As shown in FIG. 38, the terminals of the string wireless sensors 3801a, 3801b, 3801c and 3801d are gathered on the film electronic circuit substrate 3800. And, an antenna or a coil 3802 is provided in the center of the film electronic circuit substrate. The data collected from the string wireless sensor are transmitted from the antenna 3802 to outside.

Figure 39:
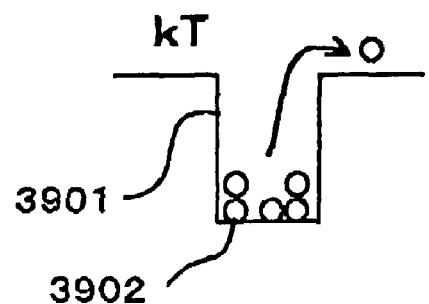
FIG. 39 is a drawing for explaining the principle of the temperature sensor provided in the wireless sensor of the present invention.

In the meantime, if a temperature sensor using non-volatile memory is provided in the respective wireless sensor, it is possible to readout the temperature at the respective wireless sensors later. Such an example will be explained here. FIG. 39 shows a principle drawing for measuring maximum temperature. If electrons are enclosed in a semiconductor, a potential well 3901 is formed. Before the measurement, a certain number of electrons 3902 are accumulated in the well. As the temperature of the semiconductor rises, the electrons 3902 are excited by heat and the probability, that the electrons jump out from the well, increases. Therefore, it is possible to assume the maximum temperature by measuring the number of the electrons remaining in the well 3901 after a certain time.

Figure 40:
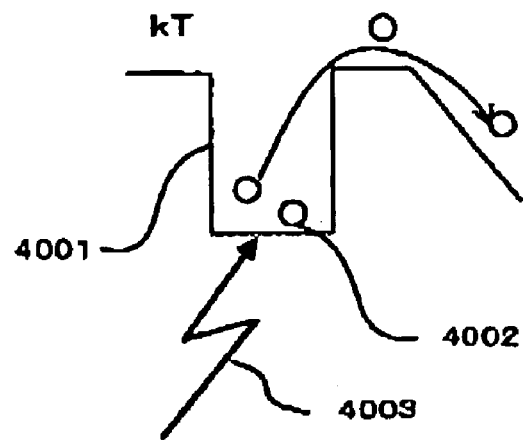
FIG. 40 is a drawing for explaining the principle to measure the maximum strength of light or radioactive rays used in the wireless sensor of the present invention.

Also, as shown in FIG. 40, it is also possible to assume the maximum intensity of the light or radioactive rays that are irradiated in a certain time of observation. In other words, in the case of the bit data of the electron 4002 accumulated in the potential well formed in a semiconductor, the electrons are excited by irradiation 4003 of light, cosmic rays and radio active rays. Therefore, as the change of the entropy corresponds to the change of the bit data, it becomes possible to measure the maximum intensity of the light or radioactive rays (Cosmic rays is one of radioactive rays).

Figure 41:
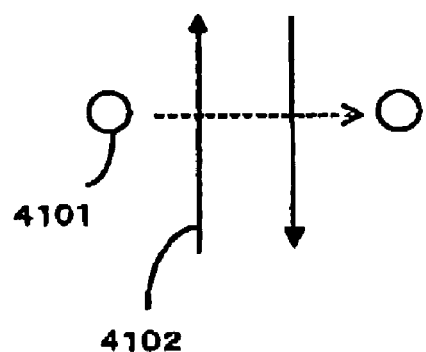
FIG. 41 is a drawing showing the principle of an example of magnetic sensor used in the wireless sensor of the present invention.
Figure 42:
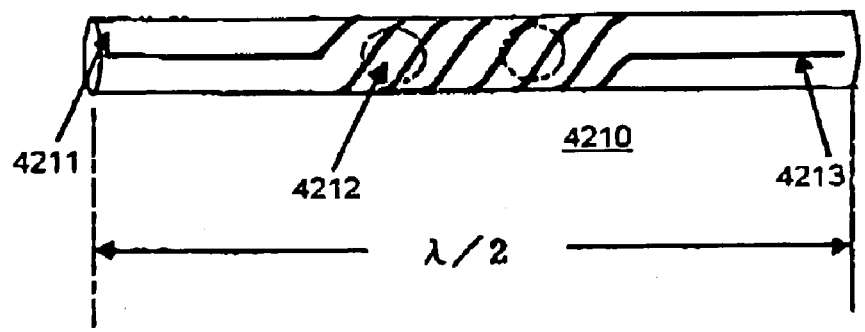
FIG. 42 is a drawing showing an example of the string wireless sensor of another embodiment of the present invention.

As shown in FIG. 41, it becomes also possible to record magnetism by utilizing TMR (Tunnel magnetism resistance effect) for keeping the bit memory, and by applying spinning 4102 to the electrons 4101, as shown in FIG. 41. In the case of the device utilizing this principle, the sensor, which is able to record the maximum magnetism, can be obtained.

Also, the sensor to measure the acceleration can record the maximum acceleration by incorporating a thin film layers sensor portion, by which piezo-electric effect can be obtained, in the sensor portion and by keeping the electric charge generated there.

In the meantime, in the case of the string wireless sensor 1104 of the embodiment of the present invention as shown in FIG. 11, a wireless sensor 1103 and a carbon-nano-coil 1102 are held within the polymer 1101. In this case, the polymer 1101 is a string holder, the carbon-nano-coil 1102 is an antenna, and the wireless sensor 1103 and the antenna are connected each other wirelessly.

As in the cases of the embodiments of the present invention shown in FIG. 21 to FIG. 24, the antenna is provided outside of the string holder. However, this antenna and the wireless sensor can be connected also wirelessly, without connecting directly.

FIG. 24 shows the constitution of the other embodiment of the string wireless sensor in accordance with the present invention. This string wireless sensor 4210 comprises string holder 4211, the wireless sensors 4211 included in the high molecular resin of this string holder and the antenna 4213 printed on the outer surface of the string holder 4211.

The wireless sensor 4212 is, for example, a spherical element of a diameter under 1 mm. Though not shown in the drawing, a temperature sensor and a modulator, which modulates the temperature signals measured by the temperature sensor and the signals specifying the position of the temperature measurement, are incorporated therein. The string holder is made of a high molecular resin, which is of thermo-plasticity. The antenna 4213 is provided on the outer surface of the string holder 4211 by means of printing technique of a conductive material as explained later. The antenna 4213 is printed so that the length of the antenna becomes $\lambda/2$ corresponding to the wireless range used for the wireless sensor, functions as a dipole antenna and transfers the signals, while the antenna is inductive-coupled together with the coil provided in the wireless sensor.

Figure 43:
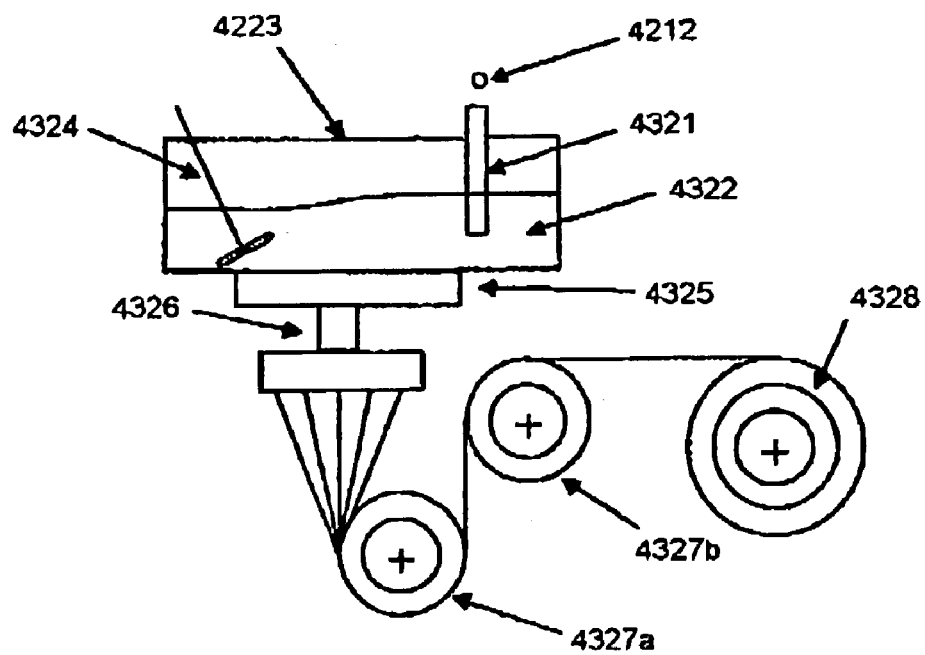
FIG. 43 is a drawing showing an example of the equipment for manufacturing the string holder shown in FIG. 42.

In this connection, the manufacturing method of the string holder 4211 in accordance with one of the embodiments of the present invention is explained. The string wireless sensor, in which wireless sensors 4212 are distributed, is manufactured, for example, by the manufacturing equipment as shown in FIG. 43. This equipment comprises a pipe 4321 for charging spherical wireless sensors 4212; the tank 4323, in which the melted high molecular resin 4322 is stored; and an agitator 4324 For dispersing the conductive filler and wireless sensors homogeneously, all of which are mounted on the upper section of the equipment and a pump 4323; a pump 4325 mounted under the tank 4323; nozzles 4326, which makes the mixture of wireless sensor and high molecular resin, which is drawn out by the pump 4325, in fiber-form and a winding reel 4328, which winds up the mixture in fiber-form, which is drawn out from the nozzles, through the cooling rollers 4327a and 4327b, which cool the mixture in fiber-form drawn out from the nozzles 4327.

The wireless sensors 4212 are charged into the pipe 4321, agitated together with melted high molecular resin 4322 by the agitator 4324, is drawn out by the pump 4325 into the nozzle 4326, is cooled down by the cooling rollers 4327a and 4327b and is wound up by the reel 4328, so that a string holder, in which wireless sensors are located and fixed at a certain distance, can be manufactured. At this stage, the antenna is not still provided.

The string holder in which wireless sensors are dispersed, and which is wound up by the winding reel 4328, is transferred to the next stage, where the outer surface of the string holder is printed with an antenna 4213.

Figure 44:
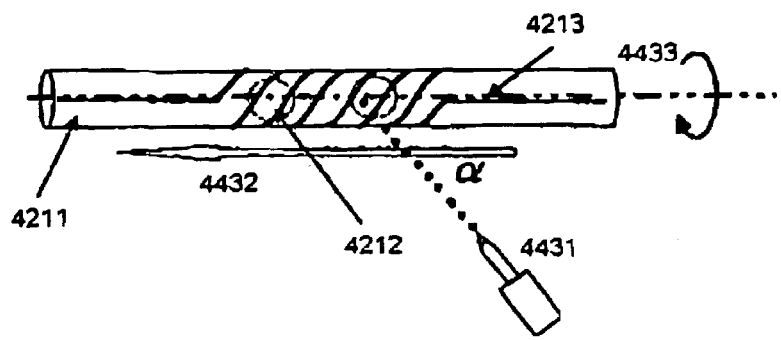
FIG. 44 is a drawing for explaining how to form the antenna for the string wireless sensor shown in FIG. 42.

FIG. 44 shows one of the embodiments of printing devices that print the antenna on the outer surface of the string bolder. The string sensor holder 4211, in which the wireless sensors 4212 are dispersed, is set in a jig, which is not shown in the drawing, and shifted in parallel with the longitudinal direction indicated by the arrow 4432, or is turned around the longitudinal axis as shown by the arrow 4433 together with the parallel transfer, namely, the string holder can be moved in a spiral. Also, ink-cartridge 4431 contains the ink in which conductive material is solved or dispersed, and located so that the ink is delivered at a certain angle α to the string holder 4211.

The ink delivered from the outlet of the ink cartridge 4431 reaches to the string holder, which is shifted parallel or shifted parallel while turning, so that the straight portion or the spiral portion of the antenna are formed respectively.

The antenna printing is performed while the string high molecular resin is located at the outlet of the ink-drops and while the string high molecular resin is shifted in longitudinal direction, in case that the antenna is straight. In case that the antenna shall be printed spirally, the print is performed by turning the high molecular resin around the longitudinal axis. When, in this case, the string high molecular resin is shifted in the longitudinal direction, an antenna, which spiral pitch corresponds to the parallel shifting speed and the turning speed, can be printed. The printing may be completed by one time parallel shifting so as to mark a continuous line, or, by printing discontinuous points by performing parallel shifting several times, so that, as a result, a continuous antenna is completed.

Furthermore, by printing series of the points each time using an array-head with a plurality of outlets of the chemical solution, the antenna may be completed by making the points a continuous line. If this method is used, the time for the printing can be saved to a large extent.

The printing of the antenna may be performed in such away that the wireless sensors of a small diameter, which incorporates a transmitter that transmits electrical signals wirelessly, are dispersed in the melted high molecular resin, and the dispersed material is extruded into fiber and then the printing is executed successively, or the resin may be stored or be sold in the dispersed state of the string, and the antenna may be formed on demand, according to requirement. If the printing may performed in this way, for example, a plurality of the wireless sensors which purposes are different, may be dispersed in string holders and the antenna may be printed, which can transmit and receive the signals with the aimed wireless sensors depending upon the application.

Figure 45:
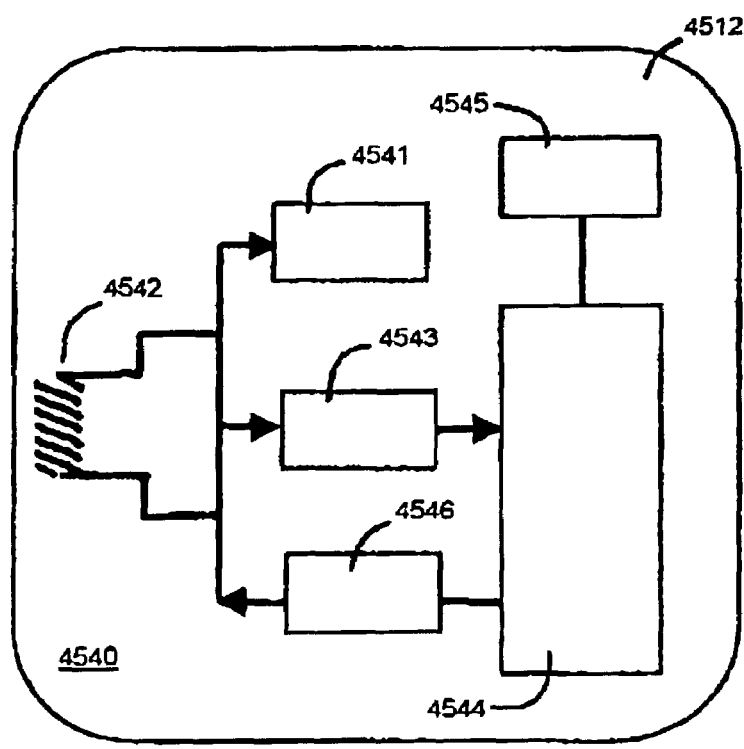
FIG. 45 is a drawing showing an example of the wireless sensor in accordance with another embodiment of the present invention.
Figure 46:
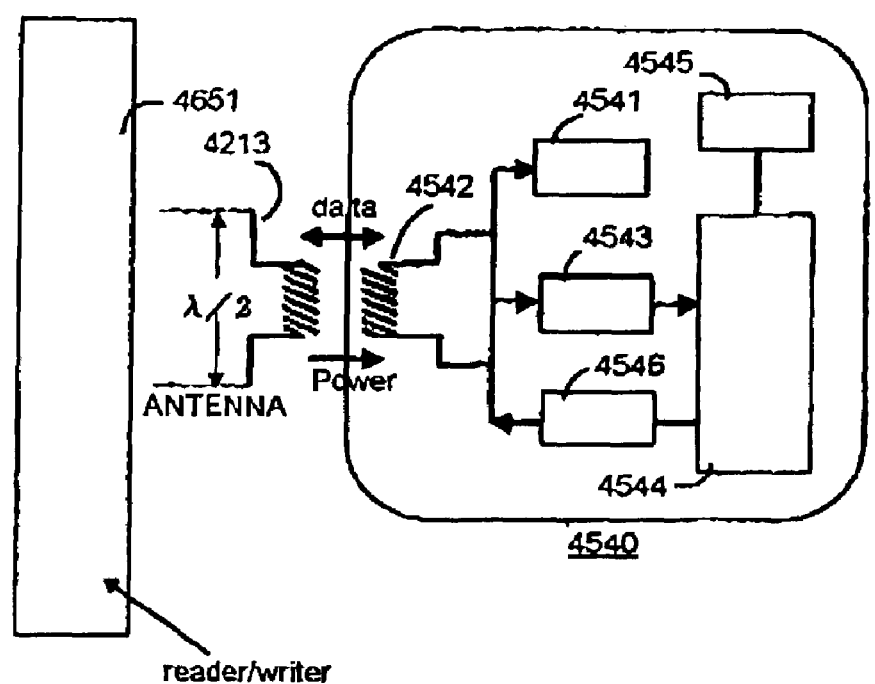
FIG. 46 is a drawing for explaining the string wireless sensor depicted in FIG. 42 and the mode of the transfer of the signals between the string wireless sensor and a reader/writer.

FIG. 45 shows an example of a constitution of the electric circuit 4540 of the wireless sensor 4212 in accordance with one of embodiments of the present invention. This electric circuit 4540 comprises an electric source portion 4541; an induction coil 4542 that transmits and receives the signals by an antenna 4213 and a electromagnetic coupling; a demodulator circuit 4543, which demodulates the signals received by the induction coil 4542; a controlling circuit 4544, which is controlled by the control signals demodulated in the demodulator circuit; a memory 4545, which stores temporally the data in this controlling circuit 4544, and modulator circuit 4546, which modulates the output from the controlling circuit 4544 and supplies the same to the induction coil mentioned in the above.

As explained in FIG. 44, the antenna 13 with a spiral portion is formed on the outer surface of the string holder 4211, in which the wireless sensors 4212 that are provided with a constitution as described in the above, are located at a certain distance, so that the string wireless sensor 4110 is formed.

Next, the communication of the signals at the string wireless sensor 4210 with the outside is explained using the drawing 46.

For the communicating the signals with the string wireless sensors, a reader/writer 4651, which can read the signals transmitted by the string wireless sensor and on which the signals can be written, is used. When the reader/writer 4651 approaches to the string wireless sensor 4210, the antenna 4213 printed on the string holder 4211 responds; and an induction coupling takes place among the induction coils; the electrical power and the data are transferred to the electric source circuit 4541 and demodulation circuit 4543 respectively.

The electrical source circuit 4541 is put into operation by the electric power supplied through the induction coil 4542, the received data are transmitted to the controlling circuit 4544 through the demodulation circuit 4543; after then the data to be transferred to outside are transferred to the inner antenna through the modulation circuit 4546, after the communication with the memory 4545 is performed; and again transferred to the reader/writer 4651 through the dipole antenna 4212 by means of the induction coupling. As the dipole antenna exists as if the same surrounds the wireless sensor, the signals are transferred to the wireless sensor effectively so that the same can function as the sensor without any erroneous function.

It is also possible to detect temperature and a like, and to transmit the same data through a modulation circuit 4546 to outside by providing the electric circuit 4540 of the string holder with a sensor that detects temperature and a like, though not shown in the embodiment mentioned in the above. Also, if the sensor that detects the position, is provided in the electric circuit 4540, the information of position is modulated by the modulation circuit 4546 and the data can be transmitted through an induction coil 4542 to outside, together with the data obtained by the other sensors, it is possible to obtain the data of the sensors at the respective positions.

Also, if the electric power necessary for the electric circuit in the electric circuit portion is supplied from outside as shown in the embodiment mentioned in the above, there is a merit that electric power generating device is not necessary within the electric circuit. However, an energy source may be provided within the electric circuit in accordance with the present invention. Also, though the signals are received by outside in the embodiment mentioned in the above, it is not always necessary to execute in such a way, but it is enough just to transfer the signals to outside at least.

It is also possible to provide a communication between the antenna and the wireless sensor by dispersing conductive filler in the string holder.

The wireless sensor 4212 used for the string wireless sensor shall include all the measuring portions which are provided in the normal wireless sensors, such as a signal processing portion, signal receiving portion, a signal transmitting portion etc. except the antenna and the size shall be under several millimeter, and further the wireless sensor under 1 millimeter is preferable also from the viewpoint of the yield. The shape may be any form such as sphere, cubic, rectangular parallelepiped, oval etc. but the preferable one is sphere or oval, which has no corner.

In the present invention, the wireless sensors are located at a certain distance in a string wireless sensor. In this case a certain distance does not mean a constant distance but may be a proper distance even though the distance is not homogeneous and some wireless sensors may be in contact.

The printing of antenna on the outer surface of the string wireless sensor is performed by preparing a ink, in which conductive material is melted or dispersed, and by blowing by nozzles or by ink-jet recording process. In case of the present invention, high molecular resin is used often as a composition of the ink, therefore, as the viscosity of the same is higher compared to normal fluid ink, trouble due to the adhesion and drying and solidifying of component may take place, the canal through which the ink flows and the outlet shall be simplified as far as possible, so that a thin tubing will not be included.

In case that a nozzle is used, attention shall be paid, so that stoppage or fluctuation of delivery does not take place by cleaning enough the pointed end of the nozzle. Also it is effective to eliminate the chance for the component to adhere by making the diameter of the canal and the diameter of the nozzle equal, so that no difference in diameter exists. The blowing by means of nozzle is suitable, when the diameter of the section of the string wireless sensor is large and the width of the line is wide.

On the other hand, in case that the diameter of the section of the string wireless sensor is under 1 cm and the width of the line of the antenna is under the order of a millimeter, the accuracy of the antenna shape cannot be increased, an ink-jet recording method is preferable.

As to the ink-jet method to print antenna, any method, technique of which is used for ink-jet printers, is acceptable. However, the ink may be condensed easily radically, due to the evaporation and volatilization of the solvent in case of ink-jet method. Furthermore, in case of the present invention, the viscosity of the ink becomes higher compared to the ink for the normal ink-jet printers, and the trouble due to adhesion and drying and solidification of the component may take place easily, so that any method that suitable for printing antenna continuously, must be improved.

In case that the method using a pressure due to piezoelectric element, though any change of ink component in quality does not take place, as there are complicate construction comprising fine tube at the canals and the outlet and a like, the ink can adhere, dry and solidify, and therefore the delivery quantity can fluctuate or cause stopping. Such being the case, it is important to remove sticking matter by cleaning enough in order to print spiral antenna with a good yield. This contributes to the assurance of the reliability of wireless sensor.

The high molecular resin used for the string holder of the present invention may of any construction, when the same is a high molecular resin that can be spun. Polyethylene, polypropylene, PET, polybutylene terephtalate, polyester, polystyrene, polyacrylic acid, polyacrlic acid ester, polymetacrylic acid, polymetacrylic acid ester, polyamino acid, polyimide, polyvinyl chloride, polyoxymethylene, polycarbonic acid ester, polyphenylene oxide, polypropylene oxide, polyphenylene ether, polyacrylonitrile, nylon (polyamide), polyurethane, vinylon, poly-ε-caprolactam, polyvinylalcohol, polylactic acid and copolymer of these high molecular resins are suitable. These high molecular resins can be used alone or blended one may be used.

In order to increase the efficiency of the antennas and wireless sensors, conductive filler may be dispersed in holder. As the conductive fillers, any filler can be used, when the filler is conductive and can be dispersed together with high molecular resin in solvent stably. Carbon black such as furnace black, acetylene black; metallic powder such as powder of nickel, copper, iron, silver, aluminum. yellow pyrite etc.; oxide such as tin oxide, zinc oxide; graphite; carbon fiber, metallic fiber (of stainless steel, aluminum, yellow pyrite etc.) metal coated fiber (carbon fiber and glass fiber etc. coated with nickel) etc. are suitable.

As the conductive material to be used in the present invention, any material can be used, if the material is conductive and can be dissolved or dispersed in solvent stably. A mixture in which conductive filler is dispersed in high molecular resin, and any high molecular resin, which is conductive itself, are suitable. These materials are used by thinning to a viscosity, which is acceptable to the delivery method mentioned in the above. In this case, in order to disperse the solid component stably, long chain fatty acids, long-chain alcohol, and dispersing material with a surface activity such as metallic soap may be added.

As the high molecular resins that can disperse conductive filler, any kind of high molecular resin can be used, when the same is soluble in solvent. Polyethylene, polypropylene, PET, polybutylene terephthalate, polyester, polystyrene, polyacrylic acid etc. are preferable. These high molecular resins can be used alone and a blended one can be also used.

As the conductive filler, any kind of material can be used, when the same is conductive and can be dispersed together with high molecular resins in a solvent. Carbon black such as furnace black, acetylene black; metallic powder such as powder of nickel, copper, iron, silver, aluminum. yellow pyrite etc.; oxide such a tin oxide, zinc oxide; graphite etc. are suitable. These are prepared to fine grain and it are added to the solvent with high molecular resin for dispersion. In order to make the dispersion stable, a dispersion material with a surface activity (surfactant) such as long chain fatty acid, long chain alcohol, metallic soap etc. may be added.

As the high molecular resins, which are conductive itself, polyaniline, polypyridine, polysilane, poly-p-phenylene, polyphenylenbinylene, polyacetylene, polypyrrole, polythiophene can be mentioned. These materials are doped with alkali metal and used. In case of conductive high molecular resin which has a low solubility in solvent, oligomer with low molecular weight, especially, with a degree of polymerization under 20 shall be used.

When string wireless sensor of the present invention is used, wherein sesame grain size wireless sensors, each of which incorporates a transmitter that transmits electric signals by wireless, are dispersed in a string holder, and the outer surface of the string holder is printed with a spiral antenna, it is possible to collect various data effectively, without scattering grain size wireless sensors wastefully.

Also by having the wireless sensor comprised with an induction coupling only, while laying the antenna proper on the outer surface of the holder, down sizing of the wireless sensor can be realized. By comparing with the conventional sesame grain size wireless sensor, at which all the antenna functions are incorporated within the wireless sensor or around the sensor, in case of the wireless sensor of the present invention, no fiber breakdown or no deterioration of strength takes place, when the same is dispersed in a high molecular resin fiber, and becomes strong against heating and washing, so that the long term reliability as a wireless sensor can be assured.

In the meantime, the string wireless sensor, which is produced in this way, can be woven and used as normal fibers. The data, which can be collected by the string wireless sensor, may be any data which can be measured, for example, temperature, pressure, light, sound, chemical species, electromagnetic wave, position, radioactivity can be mentioned.

As the receiver to be used in the present invention, any type of receiver may be sued, if the same can receive the information transmitted by the string wireless sensor.

The string wireless sensor can be used as textile material, for example, for clothes, hats, socks and stockings, pouch, bags, curtains, ropes, nets, stuffed toys, sofas, paper etc. If the same is woven together with the normal fibers, healthy and safe products can be made. In this case, if the function to detect temperature is provided in the string wireless sensor the temperature of every portion can be obtained at real time without touching the measuring object. Also, if the string wireless sensor that can transmit and receive signals, is used, the data such as date of manufacture, place of manufacture, manufacturer, number of tine of washing can be used as a means for management of the data. Also, the string wireless sensor, which can detect temperature, is woven in fishing strings and fishing nets, seawater temperature distribution can be obtained in a range of the length of fishing string or the extent of the fishing net.

Also if the string wireless sensor is mixed in the electric cable, covering of optical fiber, tires etc., when an abnormal overheat takes place, it can be immediately alarmed to prevent the accident in advance.

Also if the string wireless sensor is included in important paper such as banknotes and securities when making paper, and is dispersed in credit cards and cashing cards, the same can be used for keeping security and for managing data.

It a fine wireless sensor and light emitting particle are dispersed in the core of plastic fiber and an antenna is printed on the outer wall or covering of the fiber, the light from the light emitting particle can be converted into electric signal and transmitted by the fine wireless sensor. If the information of the position is also transmitted at the same time, the strength of ray of light incident can be monitored at a remote place. Also, if the light emitting particle is a material which emits fluorescence against radioactive rays, a combination of the light emitting particle and fine wireless sensor, which detects fluorescence, can be used for forming a radio activity detector.

In the meantime, in the explanation described in the above, it is explained that the wireless sensor is of a spherical shape of a small diameter. However, the wireless sensor, which is used in the present invention, is not always of such a shape. In short, the wireless sensor can be of any shape such as a rectangle, a square, oval, if the size is less than several millimeter.

Figure 47:
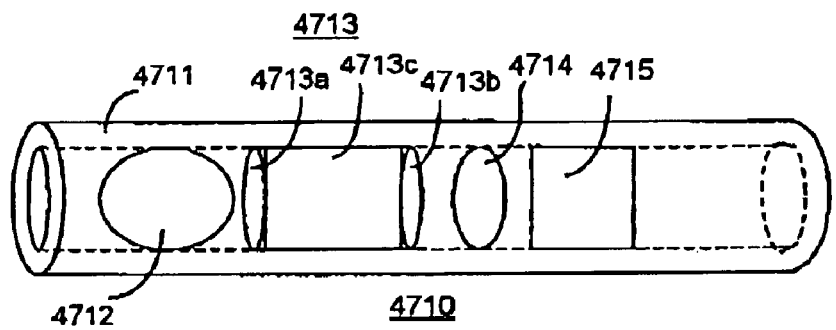
FIG. 47 is a drawing showing an example of the string wireless sensor in accordance with further another embodiment of the present invention.
Figure 48:
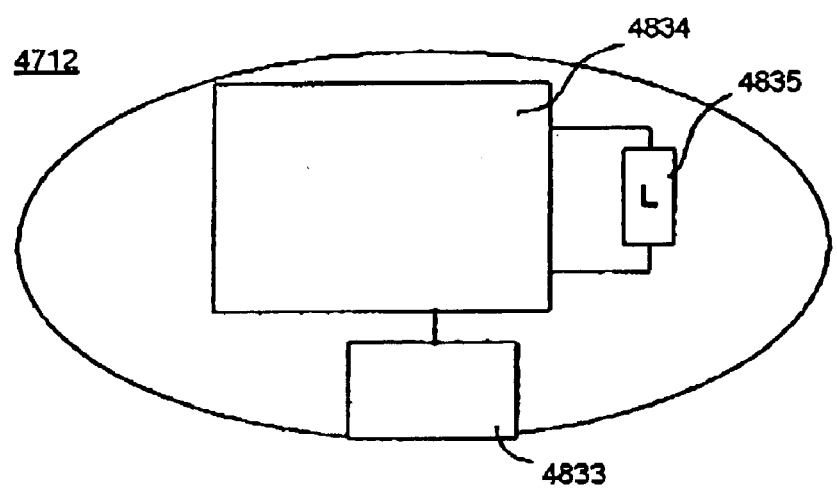
FIG. 48 is a drawing showing an example of the wireless sensor used in a string wireless sensor shown in FIG. 47.

Referring to FIG. 47 and FIG. 48, another embodiment of the string wireless sensor using oval wireless sensor is explained. FIG. 47 shows a constitution of the string wireless sensor of the present embodiment. Number 4711 indicates the hollow string holder which is made of a insulation material. In this string holder 11, a wireless sensor 4712 comprising a fine sensor IC, a string cell 4713, a fine condenser 4714, a fine resistance 4715 is included. The string cell comprises poles 4713*a* and 4713*b* and a cell proper 4713*c*. It is further preferable that an antenna is also included in the string holder.

After these parts are included, the string holder is heat treated to shrink and fix the parts, so that the string wireless sensor 4710 is formed. Though the string wireless sensor 4710 shown in FIG. 47 is straight, this string wireless sensor can be bent. A plurality of the wireless sensor 4712 can be included, as the case may be and the electric circuit can be constituted flexibly.

As FIG. 48 shows as an example, the wireless sensor 4712 comprises a sensor portion 4833, which converts the detected data of light from outside, temperature, biological data etc. into electrical measurement data; memory logic portion 4834, which process electrically the measurement data obtained by the sensor portion 4833; and a combined coil 4835, which transmits the data processed electrically at the memory logic circuit 4834. The fine condenser 14, a fine resistance 15 are small condenser and resistance and though in FIG. 47 only one each of them are depicted, more parts are included actually.

The wireless sensor 4712, a string cell 4713, a fine condenser 4714 and a fine resistance 4715 are communicated each other by light, electromagnetic wave and electromagnetic field. In the meantime, the cell may be of a string type as shown in FIG. 47, but also of multiplex ring type or chain type. Also, as an electrical charge can be stored in a part of the string as a coaxial condenser, it works as an equivalent battery.

As described in the above, the string wireless sensor of the present invention, can be fixed, after the wireless sensors are inserted into the hollow string holder at a certain distance.

Then, it was explained that wireless sensors are located at a certain distance in accordance with the present invention. However, a certain distance does not mean the specified constant distance but with an adequate opening so that the distance may be uneven. Partly, the adjacent wireless sensors may be in contact each other.

Also in the embodiments mentioned in the above, the case that the wireless sensors, which incorporates the sensors that can detect temperature and pressure, was explained. However, the objects for detection are not limited to these. Any object is acceptable, if the same can be measured.

Also, in the case of the wireless sensors that are used in the present invention, it is not always necessary to incorporate any sensor therein but may just have a function to transmit the position of itself. As an application example, when the built-in antenna itself in the string wireless sensor is damaged by cutting, the transmitting function is lost, namely, an abnormal condition can be detected. Such being the case, it is possible to monitor cracks in the construction materials or walls.

Also, when the position of the wireless sensor can be specified, the position sensor is not necessary and the sensor that can detect temperature will be enough.

The receiver which is used in the present invention, can be of any type, it the same can receive the electrical signals transmitted by the wireless sensors.

As described in the above, in accordance with present invention, a string wireless sensor which can use fine wireless sensors as well as its producing method can be obtained.

What is claimed is:

1. A string wireless sensor comprising:
   a wireless sensor, which comprises a first electromagnetic coil, a smoothing circuit which smoothes the electromotive force induced by this electromagnetic coil, an oscillating circuit which oscillates upon receipt of the output of the smoothing circuit as well as the second electromagnetic coil, which passes the output of the oscillating circuit;
   an optical signal generating portion, which converts the electric signals detected by wireless sensor into optical signals; and
   a string holder which holds the optical signal generator and the wireless sensor at certain distance;
   wherein the oscillating circuit is the oscillating circuit which frequency changes depending on temperature, the wireless sensor receives an electric power at the first electromagnetic coil, and at the same time, optical signals generated by the optical signal generating portion are transmitted through the holder.

2. A string wireless sensor according to claim 1, wherein the oscillating circuit is a COLPITS oscillator with a condenser, which capacity changes depending upon temperature.

3. A string wireless sensor according to claim 1, wherein the oscillating circuit is a non-stable multi-vibrator, which resistance changes depending on temperature.

4. A string wireless sensor according to claim 1, wherein the optical signal generating portion is a LED.

5. A string wireless sensor according to claim 1, wherein the holder is made of plastic optical fiber.

6. A position detecting method using a string wireless sensor comprising:
   a transmitting step that transmits electric signal from a transmitter of the string wireless sensor comprising wireless sensor incorporating the transmitter that transmits electric signal by wireless; and
   a position detecting step that receives the electric signal transmitted by the transmitting step and detects the position of the wireless sensor which has transmitted the electric signal by a receiver.

7. A sensor value detecting method comprising:
   a transmitting step that transmits electric signals from a transmitting portion of a string wireless sensor, comprising a wireless sensor which incorporates a sensor and the transmitting portion that transmits the measured value as electric signal by wireless; and a string holder which holds wireless sensors at a certain distance; and
   a detecting step that receives the electric signal transmitted by the transmitting step, and detects the position of the wireless sensor, which has transmitted the electric signals and the value which is measured by the sensor of the wireless sensor.

* * * * *